(12) United States Patent
Van Der Heijden et al.

(10) Patent No.: US 10,520,123 B2
(45) Date of Patent: Dec. 31, 2019

(54) HOLLOW BODY COUPLING DEVICE

(71) Applicant: Diversey, Inc., Charlotte, NC (US)

(72) Inventors: Lambertus Gerardus Petrus Van Der Heijden, Bunnik (NL); Jasper de Vries, Utrecht (NL); Victor Laurentius Maria Driever, Rotterdam (NL)

(73) Assignee: Diversey, Inc., Fort Mill, SC (US)

( * ) Notice: Subject to any disclaimer, the term of this patent is extended or adjusted under 35 U.S.C. 154(b) by 175 days.

(21) Appl. No.: 15/552,910

(22) PCT Filed: Feb. 24, 2016

(86) PCT No.: PCT/US2016/019213
§ 371 (c)(1),
(2) Date: Aug. 23, 2017

(87) PCT Pub. No.: WO2016/138053
PCT Pub. Date: Sep. 1, 2016

(65) Prior Publication Data
US 2018/0045350 A1    Feb. 15, 2018

Related U.S. Application Data

(60) Provisional application No. 62/120,017, filed on Feb. 24, 2015.

(51) Int. Cl.
*F16L 37/34*    (2006.01)
*F16L 37/36*    (2006.01)
(Continued)

(52) U.S. Cl.
CPC ............ *F16L 37/34* (2013.01); *B67D 1/0832* (2013.01); *F16L 37/36* (2013.01); *F16L 37/35* (2013.01)

(58) Field of Classification Search
CPC ...... F16L 37/34; F16L 37/36; B67D 12/0832; Y10T 137/87941
See application file for complete search history.

(56) References Cited

U.S. PATENT DOCUMENTS 2,393,489 A * 1/1946 Trautman ................ F16L 37/35
137/614.02
2,678,834 A * 5/1954 Courtot .................. F16L 37/101
137/614.02
(Continued)

FOREIGN PATENT DOCUMENTS

| WO | 00/76906 A1 | 12/2000 |
| WO | 2006/043883 A1 | 4/2006 |
| WO | 2012/062821 A1 | 5/2012 |

OTHER PUBLICATIONS

International Search Report and Written Opinion for International Patent Application No. PCT/US2016/019213 dated Jun. 3, 2016; 14 pages.
(Continued)

*Primary Examiner* — Eric Keasel
*Assistant Examiner* — Kevin R Barss
(74) *Attorney, Agent, or Firm* — Andrew R. Aranda

(57) ABSTRACT

An interconnector system (10) for coupling a first hollow body to a second hollow body allows fluid communication between the hollow bodies. The interconnector system (10) includes a valve interconnector (14) and a receiver interconnector (12). The receiver interconnector (12) has a sliding seal sleeve (20) that slides relative to a hollow post (18). The design of the receiver interconnector (12) ensures that the valve interconnector (14) cannot be decoupled from the receiver interconnector (12) without the seal sleeve (12) sealing closed the liquid passageway (46) through the hollow post (18). Also included is a hollow body having a coupling device thereon.

19 Claims, 24 Drawing Sheets

(51) Int. Cl.
*B67D 1/08* (2006.01)
*F16L 37/35* (2006.01)

(56) References Cited

U.S. PATENT DOCUMENTS

| | | | | | |
|---|---|---|---|---|---|
| 3,120,968 | A | * | 2/1964 | Calvin | F16L 37/22 |
| | | | | | 285/277 |
| 3,285,283 | A | * | 11/1966 | Calvin | F16L 37/084 |
| | | | | | 137/614.03 |
| 4,142,658 | A | * | 3/1979 | Golding | B67D 1/0832 |
| | | | | | 137/212 |
| 6,325,100 | B1 | * | 12/2001 | Bunschoten | B67D 1/0832 |
| | | | | | 137/614.04 |
| 2003/0032940 | A1 | * | 2/2003 | Doyle | A61M 39/045 |
| | | | | | 604/533 |
| 2013/0312846 | A1 | * | 11/2013 | Eriksen | F16L 37/34 |
| | | | | | 137/315.01 |
| 2016/0047503 | A1 | * | 2/2016 | Ballard | F16L 37/34 |
| | | | | | 251/149.7 |

OTHER PUBLICATIONS

Extended European Search Report of counterpart European Application No. 19167987.7 dated Jul. 5, 2019; 11 pages.

* cited by examiner

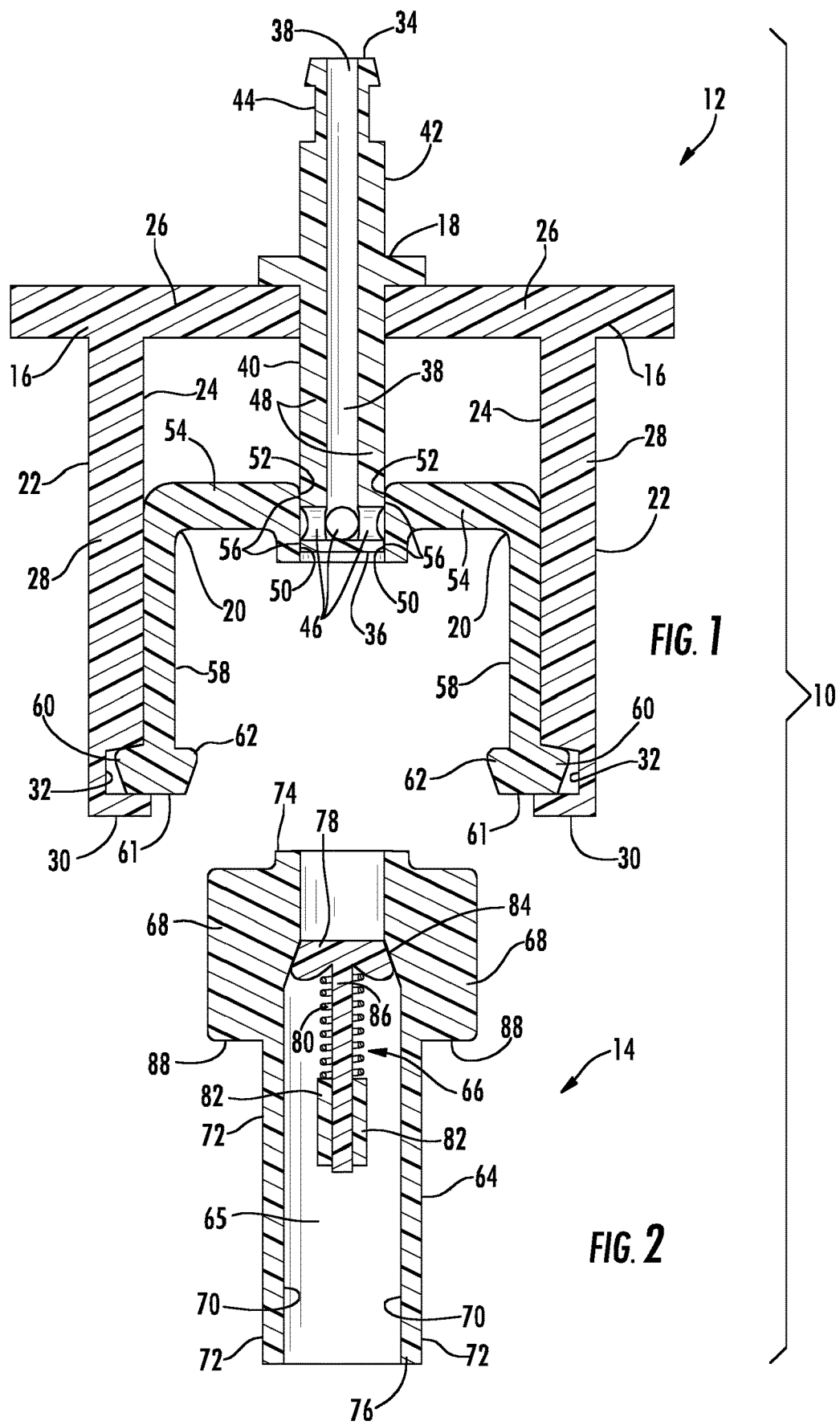

HOLLOW BODY COUPLING DEVICE

FIELD

The invention disclosed herein relates to coupling devices. More particularly, coupling devices for connecting hollow bodies (such as containers and tubing) to one another so that part or all of the contents of one the hollow bodies can be transferred to the other hollow body through the coupling device.

BACKGROUND

International Publication Number WO 00/76906 discloses a coupling device for liquid product packaging and dispensing, with which liquid is pumped from a container via the coupling through a tube to the point of use. While decoupled, the coupling comprises a first interconnectable member with a hollow post and a seal sleeve spring-biased into a position that it covers (and closes) fluid flow openings in a hollow post, and a second interconnectable member with a hollow sheath and a valve which is spring biased into a closed position at the end of the hollow sheath. Upon coupling, the post unseats the valve while the sheath displaces the sleeve, thereby allowing liquid flow. An elastic ring is present between the sheath and the sleeve which ring is compressed in the axial direction and expanded in the radial direction towards the post so as to establish a close fit around the post.

The coupling device of WO 00/76906 may remain in the coupled position for long periods of time, as the supply container holding the liquid to be dispensed may be supplied as a multiplicity of relatively small aliquots over a relatively long time period. While in the coupled position, one of the interconnectors has a hollow post open for fluid flow due to a coaxial seal sleeve being forced back from its spring-biased position during the coupling of the interconnectors. The hollow post has passageways through which liquid is dispensed (from a first hollow body) into the interior of the second interconnector, which liquid thereafter flows towards and into the second hollow body.

Long periods during which the interconnectors are in the coupled position can result in the drying of liquid on the uncovered outer surface of the hollow post, resulting in a solid residue firmly adhered to the outer surface of the hollow post. Upon disconnection of the interconnectors from one another, the residue on the outer surface of the hollow post can be adhered to the hollow post to a degree that it prevents the bias spring from forcing the seal sleeve back over the hollow post. When this occurs, liquid inside the coupling device (together with any liquid inside first hollow body) can drip from the openings in the extended hollow post, with the resulting contamination of the area by the dripping liquid.

Liquid dripping from the hollow post is undesirable as it is a waste of product and produces a spill which must be recovered and disposed of. Moreover, the liquid which escapes from the system has the potential to come into contact with the skin of workers and/or damage other objects or supplies. It would be desirable to have a coupling device in which the passageways through the hollow post are covered upon decoupling, even if the hollow post has been extended for a prolonged period.

SUMMARY

As with the coupling device of WO 00/76906, the interconnector system of the invention has a first interconnector having a hollow post which unseats a piston in the second interconnector, while a sheath in the second interconnector displaces a seal sleeve in the first interconnector. The seal sleeve covers one or more passageway through the hollow post. Although these features of the interconnector system are similar to the coupling device of WO 00/76906, the interconnector system of the invention differs in that it is designed so that the decoupling act itself forces the seal sleeve back into a position covering and closing the passageway(s) through the hollow post, preventing leakage through the hollow post. Forcing the seal sleeve back over the passageways in the hollow post is accomplished by designing the interconnector system so that the decoupling act can only be accomplished if the second interconnector applies enough force to cause the seal sleeve to move down over the openings through the hollow post. The force is exerted via one or more components of the second interconnector. In this manner the openings through the hollow post are covered by the seal sleeve due to the force exerted during the manual decoupling of the interconnectors.

During decoupling, if the adhesion of dried liquid to the outer surface of the hollow post impairs movement of the seal sleeve over the passageways through the hollow post, the decoupling operator is immediately made aware of the presence of the adhering dried liquid by the amount of decoupling force required. If the operator can apply enough force that the seal sleeve displaces the dried liquid on the outer surface of the hollow post, decoupling occurs in a manner that the passageways through the hollow post are covered and closed by the seal sleeve, preventing leakage of fluid through the passageways in the hollow post. If dried liquid is adhered to the outer surface of the hollow post with enough tenacity that the operator cannot force the seal sleeve to displace the dried liquid, the interconnectors remain coupled, thereby also preventing leakage of fluid out of the system. Either way, leakage is prevented.

In the coupling system of the invention (and in contrast to the coupling system of WO 0096906), ensuring that decoupling occurs in a manner so that the seal sleeve moves into position to cover the passageway(s) through the hollow post is not dependent upon the strength of a bias spring. Rather, the interconnectors are designed so decoupling cannot occur unless the seal sleeve moves into a position covering the passageway(s) in the hollow post.

A first aspect is directed to an interconnector system for coupling a first hollow body to a second hollow body to allow fluid communication between the first and second hollow bodies. The interconnector comprises a valve interconnector and a receiver interconnector. The valve interconnector comprises a neck, a valve assembly, and a retention flange. The neck has an internal surface and an external surface. The internal surface defining a longitudinal passageway through the neck. The neck has an internal end for coupling and an external end for securing the first hollow body to the valve interconnector. The valve assembly is inside the longitudinal passageway through the neck. The valve assembly comprises a valve head, a valve stem, and a valve retainer. The valve head is biased away from the valve retainer and toward a valve seat inward of the valve head. The valve head is moveable from a closed position to an open position. The retention flange extends radially outward from the neck.

The hollow receiver interconnector comprises a housing, a hollow post, and a slidable retainer/seal sleeve. The housing comprises a base member and an axial extension projecting from the base member. The housing has an internal surface for receiving the valve interconnector. The hollow post has a closed internal valve-contact end, an open external end, and an internal longitudinal passageway therethrough. The longitudinal passageway extends from the open external end to the closed valve-contact end. At least an internal portion of the hollow post is inside the housing. The hollow post or the housing provides a surface for attachment to the second hollow body. The hollow post is in a fixed position relative to the housing. The hollow post has at least one radial passageway through a wall thereof. The internal portion of the hollow post provides an external first sealing surface between the closed end of the hollow post and the radial passageway through the wall of the hollow post. The hollow post provides an external second sealing surface outward of the radial passageway through the wall of the hollow post. The slidable retainer/seal sleeve is inside the housing. The retainer/seal sleeve has a head portion extending around the hollow post, with the head portion providing an inner sealing surface. The retainer/seal sleeve is slidable along the hollow post from an uncoupled position to a coupled position. The retainer/seal sleeve further comprises a valve retention surface.

With the interconnectors in an uncoupled configuration: (a) the valve head is in the closed position with the valve head being held in biased contact with the valve seat, and (b) the retainer/seal sleeve is in the uncoupled position with the inner sealing surface of the retainer/seal sleeve covering the first and second sealing surfaces on the hollow post to seal closed the radial passageway thorough the wall in the hollow post. With the interconnectors in a coupled configuration: (a') the valve head is in the open position with the valve head being separated from the valve seat and held in the open position by the closed end of the hollow post and (b') the retainer/seal sleeve is in the coupled position leaving open the radial passageway through the wall of the hollow post, and the valve retention surface engaging the retaining flange of the valve interconnector to retain the valve interconnector within the retainer/seal sleeve while the interconnectors are coupled to one another.

In an embodiment, the internal surface of the housing comprises a decoupling notch, and the slidable retainer/seal sleeve comprises a head portion and at least two axially extending flexible flap members. Each flap member extends axially toward the receiving end of the housing, and each flap member has an inner locking lug and outer locking lug. With the interconnectors in an uncoupled configuration, the outer locking lug of each of the flap members is positioned in the decoupling notch in the receiver housing. With the interconnectors in a coupled configuration, the inner locking lugs of the flap members contact the radial retention surface of the retention flange to retain the valve interconnector inside the receiver interconnector.

In an embodiment, the interconnector system further comprises a releasable seal sleeve retention member biased toward the head portion of the seal sleeve/retention member. The releasable seal sleeve/retention member engages the seal sleeve when the seal sleeve is in the coupled position, so that axial movement of the seal sleeve/retention member is prevented by the releasable seal sleeve retention member while the valve interconnector is coupled to the receiver interconnector. The seal sleeve retention member being manually releasable to allow the receiver interconnector to be decoupled from the receiver interconnector.

In an embodiment, the receiver housing has a radial surface which contacts the seal sleeve/retention member when the seal sleeve/retention member is in the uncoupled position, to prevent the head portion of the seal sleeve/ retention member from sliding off the closed end of the hollow post.

In an embodiment, the retention flange on the valve interconnector is a first flange extending from the neck, and the neck further comprises a second flange extending therefrom. The second flange is spaced apart from the first flange. The housing base member and the axial extension projecting from the base member together provide a recess for receiving the valve interconnector. The recess terminates in a transverse mounting plate. The hollow post is mounted in the transverse mounting plate. The hollow post extends into the recess. The receiver interconnector further comprises a rotatable elevator member rotatably secured around an outer surface of the axial extension of the base member. The rotatable elevator member comprises an arcuate axial wall having a top edge contacting a surface of the housing from which the outer surface of the axial extension extends. The rotatable elevator member further comprises a radial projection extending outward from the arcuate axial wall. The radial projection has a manually-actuatable rotation tab extending therefrom. The arcuate axial wall has a helical guideway therein. The slidable retainer/seal sleeve comprises an assembly of a seal sleeve component and a retainer component, with the seal sleeve component and the retainer component being secured to one another so that they remain in a fixed relationship relative to one another with the interconnector system in the coupled configuration and with the interconnector system in the uncoupled configuration. The retainer component is radially open for receiving the valve interconnector. The retainer component has a plurality of axial guides each of which slides in an axial direction within a corresponding axial recess in the axial extension of the base member. At least one of the guides having a radial elevator protrusion extending outward therefrom, which pin is positioned to slide within the helical guideway in the elevator member as the elevator member is rotated. The retainer comprises a retention and movement key having upper and lower radial surfaces which fit between the first and second flanges of the valve interconnector.

In an embodiment, the housing further comprises a housing adapter fixedly secured to the housing. Moreover, the housing has an internal surface for receiving the slidable retainer/seal sleeve, and the housing adapter has an internal surface for receiving the valve interconnector.

In an embodiment, the valve interconnector further comprises a base cap secured to the neck. The base cap comprises: (a) a radially extending base cap head portion covering the internal end of the neck, (b) an axially extending base cap exterior tube portion covering a portion of the exterior surface of the neck, and (c) an axially extending base cap interior tube portion extending into the primary longitudinal passageway through the neck, the interior tube portion having an end providing the valve seat. The valve assembly further comprises a valve stem extending from the valve head. The valve stem is slidably positioned within a valve stem passageway through a liquid permeable valve retainer. The valve retainer is secured to the interior tube portion of the base cap.

In an embodiment, the housing of the receiver interconnector is colored, and the valve interconnector further comprises a coded ring covering at least a portion of an external surface of the base cap and secured to the base cap. The coded ring has a color matching the color of the housing.

In an embodiment, the coded ring further comprises a plurality of radial keys protruding therefrom, and the housing has an internal surface comprising a corresponding plurality of radially-extending keyways. Each of the plurality of radially-extending keys extending from the coded ring is sized and positioned for mating engagement with the corresponding plurality of radial keyways in the housing upon coupling the valve interconnector with the receiver interconnector. The coded ring has an outward edge comprising a plurality of axially-extending alignment lugs, and the coupling retention flange has a corresponding plurality of axially extending alignment channels, with the plurality of axially-extending lugs on the colored ring being sized and positioned for insertion into the corresponding plurality of axially-extending channels in the retention flange. In an embodiment, the receiver housing has the same color as the coded ring.

In an embodiment, the coded ring further comprises a ring head portion, with the ring head portion comprising an axial key. The axial key is inward of the head of the base cap. The inward surface of the seal sleeve portion of the seal sleeve/retainer has an axial keyway (i.e., recess) within which the axial key is positioned with the interconnectors being in the coupled configuration.

In an embodiment, the valve head is biased toward the valve seat by a spring inside the valve retainer, the spring being around the valve stem, the spring allowing the valve head and valve stem to slide within the valve retainer while the valve head is biased toward the valve seat.

In an embodiment, the valve interconnector further comprises a resilient sealing ring inside the interior tube portion of the base cap. The base cap limits or prevents expansion of the sealing ring in the radial direction away from the hollow post to provide a leak-proof connection between the valve interconnector and the hollow post when the valve interconnector is coupled to the receiver interconnector and the resilient sealing ring is axially compressed. In an embodiment, the resilient ring has at least one annular ridge on its inner surface.

In an embodiment, the closed end of the hollow post is convex, and the valve head has a concave top surface, and the convex surface of the closed end of the hollow post has a radius smaller than a radius of the concave top surface of the valve head.

In an embodiment, the interconnector system further comprises a flow restrictor. The flow restrictor can be in the valve retainer or in a tubing attached to the valve retainer.

In an embodiment, the valve interconnector or the receiver interconnector further comprises a sensor activated by coupling the valve interconnector with the receiver interconnector.

In an embodiment, the valve interconnector or the receiver interconnector further comprises an optical cell to indicate when a container is empty. In an embodiment, the optical cell indicates whether liquid is inside a transparent tubing.

In an embodiment, the hollow post has at least two radial passageways through the wall thereof. In another embodiment, the hollow post has at least 3 radial passageways through the post wall. In another embodiment, the hollow post has four passageways through the post wall.

In an embodiment, the valve interconnector further comprises a bonding member on the external end of the neck thereof, the bonding member having an outer bonding surface for attaching the first hollow body to the valve interconnector.

In an embodiment, one of the interconnectors is connected to a hollow container containing a liquid chemical concentrate and the other interconnector is connected to a tube.

In an embodiment, the receiver interconnector is mounted in a fixed position on a support member.

In an embodiment, the receiver interconnector is mounted so that the valve interconnector is above the receiver interconnector when the valve interconnector is coupled to the receiver interconnector. In an embodiment, the receiver interconnector is mounted so that the valve interconnector is below the receiver interconnector when the valve interconnector is coupled to the receiver interconnector.

In an embodiment, the receiver housing has at least one radial surface which contacts the seal sleeve to limit motion of the seal sleeve, so that the seal sleeve is prevented from sliding outside a range extending from its coupled position to its uncoupled position. In an embodiment, the radial surface is a radial shelf on an inside surface of housing, with the radial surface contacting an inward surface of the head of seal sleeve to prevent the seal sleeve from moving further from the base portion of the housing. In an embodiment, the radial surface is a decoupling notch at receiving end of housing which retains the outward lugs of the flap members to prevent the seal sleeve from moving further from the base portion of the housing. In an embodiment, the base portion of housing contacts the seal sleeve when seal sleeve is in coupled position to prevent the head of the seal sleeve from sliding further away from the closed end of the hollow post.

A second aspect is directed to a hollow body having a coupling device thereon. The coupling device comprises an interconnector system according to the first aspect.

In an embodiment, the hollow body is bonded to the neck of the valve interconnector.

In an embodiment, the hollow body is bonded to the hollow post of the receiver interconnector.

BRIEF DESCRIPTION OF THE DRAWINGS

FIG. 1 is a longitudinal cross-sectional view of a first embodiment of a receiver interconnector in an uncoupled configuration.

FIG. 2 is a longitudinal cross-sectional view of an embodiment of a valve interconnector in an uncoupled configuration.

DETAILED DESCRIPTION

Figure 3:
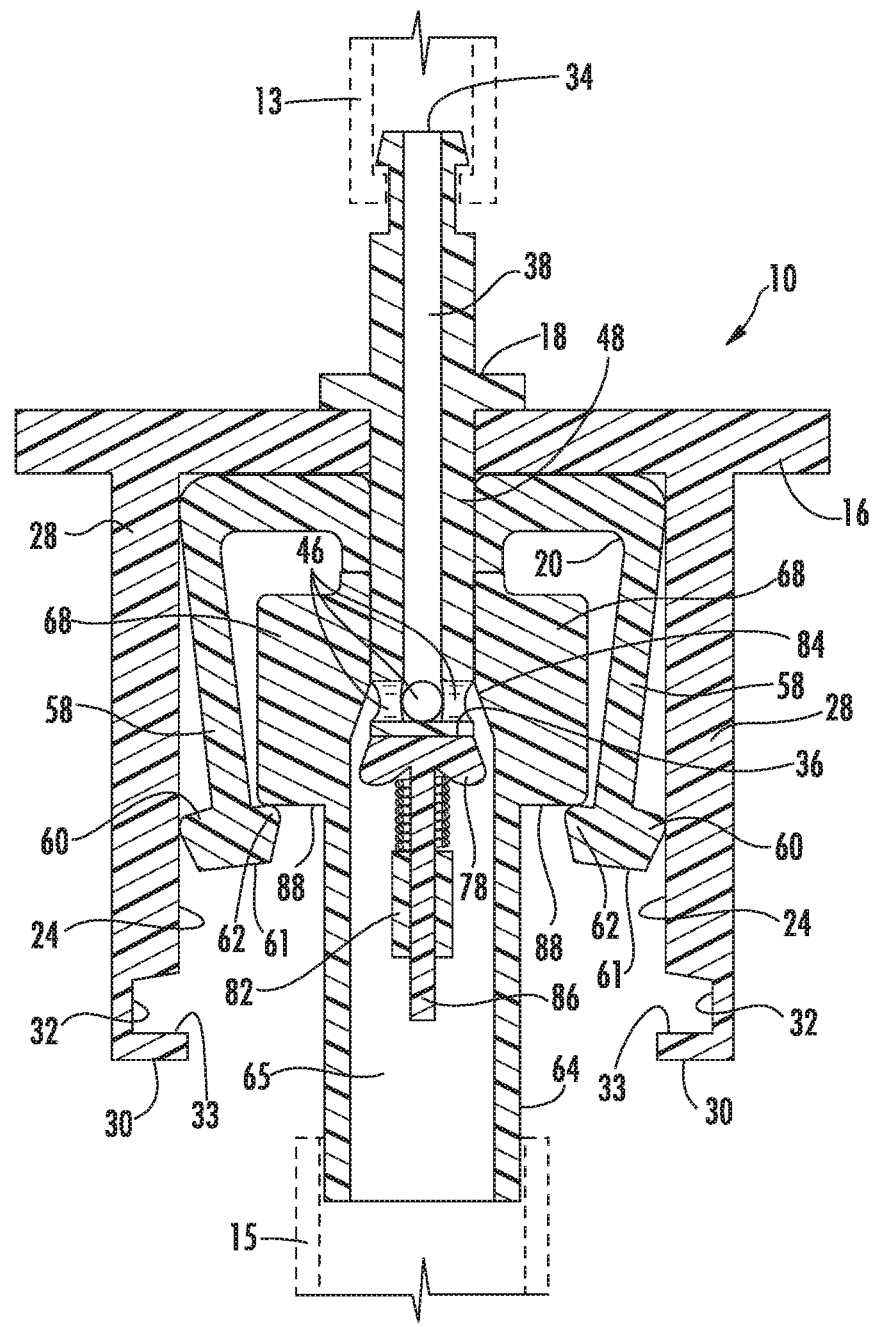
FIG. 3 is a longitudinal cross-sectional view of an embodiment of an interconnector system in a coupled configuration.

Various terms and phrases are used herein with respect to interconnectors and interconnector systems. Interconnectors are coupled to one another by bringing the mating ends of the interconnectors into contact with each other and coupling them together so that fluid can pass through the interconnector system, including each interconnector and the junction between the interconnectors. As used herein, the phrase "interconnector" refers to a coupling device that is designed to mate with at least one additional coupling device, such as a complementary coupling device, in order to provide an "interconnector system" which provides a controlled path for the passage of liquid from a first location, through the coupled devices, to a second location.

As described herein, the receiver interconnector has a housing comprising a "mounting base." As used herein, the "housing" portion of the receiver interconnector is inclusive of a mounting base portion an extension portion. The mounting base portion can be integral with the extension portion, or the extension can be secured to the mounting base. Moreover, the hollow post can be secured to the mounting base, regardless of whether the mounting base is integral with the extension portion of the housing or whether the extension portion is secured to the mounting base.

Because interconnectors are designed for the flow of liquid therethrough upon coupling, interconnectors, as well as many of their component parts, are typically "hollow," i.e., are of a tubular nature, i.e., having one or more passageways therethrough. Many component parts of interconnectors have "longitudinal passageways" in which the axis of the passageway is central and concurrent with the axis of the part, or substantially parallel to the longitudinal axis of the part or interconnector, or closer to parallel to the longitudinal axis of the part than to perpendicular to the longitudinal axis of the part. In contrast, "radial passageways" are perpendicular to or substantially perpendicular to the longitudinal axis of the component part, or closer to perpendicular to the longitudinal axis of the part than parallel to the longitudinal axis of the part.

Hollow components are herein referred to as having an "external surface" and an "internal surface" just as a pipe has an external surface and an internal surface. A component part located inside an internal surface of another component is herein referred to as being "inside" the other component.

Moreover, because interconnectors are brought together in an orientation in which they are to be coupled to one another, interconnector component parts have "ends." An end of a component part can be oriented toward the other interconnector (herein referred to as an "internal end"), or oriented away from the other interconnector (herein referred to as an "external end").

Surfaces of interconnector component parts can be parallel or substantially parallel to an axis through the interconnector. Such surfaces are herein referred to as "axial surfaces" or "axially extending surfaces" or "surfaces which extend axially." Other surfaces of interconnector parts can be perpendicular to or substantially perpendicular to the axis through the interconnector and/or through the part. Such surfaces are herein referred to a "radial surfaces" or "radially extending surfaces" or "surfaces which extend radially."

Since interconnector systems in coupled relationship are designed to have liquid passing through them without spilling, surfaces of various component parts of interconnectors are designed to form a liquid-tight seal with surfaces of other component parts of interconnectors. Such surfaces are herein referred to as "seal surfaces."

Some component parts can be divided into a plurality of "portions." For example, a component part which transitions from one shape to another, or which passes through another component part, can be referred to as having an "internal portion" (i.e., the portion closer to the other interconnector) and an "external portion" (i.e., the portion further from the other interconnector). A portion of a component part, a portion of a surface of a component part, etc., can be referred to with reference to another feature of the same component part.

If the subject portion of a component part is further from the inside end of the component than is the reference feature, then the subject portion is referred to as being "outward" of the reference feature. If the subject portion of a component part is closer to the inside end of the component than is the reference feature, the subject portion is referred to as being "inward" of the reference feature.

If the subject portion of a component part is further from the axis of the component part than is the reference feature, then the subject portion is referred to as being "radially outward" of the reference feature. If the subject portion of a component part is closer to the axis of the component part than is the reference feature, then the subject portion is referred to as being "radially inward" of the reference feature.

The external ends of an interconnector are designed to enable the interconnector to connect to a hollow body. The phrase "hollow body" is inclusive of containers and packages holding, or having the capacity to hold, a flowable substance (packages, bags, casings, buckets, trays, etc.), as well as conduits such as hoses, pipes, etc. which are open at both ends but are designed to contain a flowable material at a location, and/or control the path of passage of a flowable material, such as a liquid, from a first location to a second location.

Unless noted otherwise, the phrases "retainer/seal sleeve" and "seal sleeve" are used interchangeably and refer to the same component part or to the same assembly of component parts. The seal sleeve and the retainer/seal sleeve can be retained in the coupled position within the housing using a "retention member," i.e., a locking mechanism. Retention members can take many forms, including members which engage the seal sleeve with a notch to prevent the seal sleeve from sliding down the hollow post.

As used herein, the phrase "valve retention surface" refers to a surface on the receiver interconnector which functions to retain the valve interconnector in a coupled position when the valve interconnector is coupled with the receiver interconnector. Valve retention surfaces include inner lugs in the embodiment of FIGS. 1-11, 15-17, as well as surfaces on retention and movement keys 348 in the embodiments of FIGS. 19-23. Valve retention surfaces can be radial surfaces.

As used herein, the terms "lugs" and "keys" are equivalents, as are the terms "channels" and "keyways."

FIG. 1 illustrates a longitudinal cross-sectional view of a first embodiment of receiver interconnector 12 in an uncoupled configuration. Receiver interconnector 12 has housing 16, hollow post 18, and seal sleeve 20. Housing 16 has mounting base 26 and extension 28. Extension 28 has external surface 22 and internal surface 24. Extension 28 terminates in receiving end 30 for receiving valve interconnector 14 illustrated in FIG. 2. Internal surface 24 has dado-type decoupling notch 32 (i.e., "closed" notch).

Hollow post 18 has open external end 34, closed internal valve-contact end 36, and internal longitudinal passageway 38 extending from open end 34 to closed valve-contact end 36. Hollow post has internal portion 40 inside housing 16 and an external portion 42 outward of housing 16. External portion 42 has an external surface 44 for attachment to the second hollow body (illustrated schematically by reference number 13 in FIG. 3). Hollow post 18 is in a fixed position relative to housing 16. Hollow post 18 has a plurality of radial passageways 46 through wall 48 thereof. Internal portion 40 of hollow post 18 has first external sealing surface 50 between closed end 36 and radial passageways 46, and second external sealing surface 52 outward of the radial passageways 46.

Seal sleeve 20 is inside housing 16. Seal sleeve 20 has head portion 54 extending around hollow post 18. Head portion 54 has inner sealing surface 56. Seal sleeve 20 is slidable along hollow internal portion 40 of hollow post 18 from an uncoupled position as illustrated in FIG. 1, to a coupled position as illustrated in FIG. 3. Seal sleeve 20 has at least two axially extending, outwardly-biased flexible flap members 58. Each flexible flap member 58 extends axially toward receiving end 30 of extension 28. Each flap member 58 has outer locking lug 60 and inner locking lug 62. The outward bias of flap members 58 causes the outer lugs of the flap members to remain against the inside surface 24 of extension 28. The outward bias of flap members 58 is a bias radially outward, keeping flap members 58 (or outer locking lugs 60) in contact with the inside surface of housing 16 as seal sleeve 20 slides from its decoupled position to its coupled position. During decoupling, the outward bias of flap members 58 causes outer locking lugs to move into decoupling notches 32. In the embodiment of FIG. 1, notches 32 are full dado grooves, i.e., notches 32 have a seal sleeve retention surface 33 (FIG. 3) which contacts the end surface 61 of each flap member 58 when flap members 58 are in their decoupled position (i.e., the position illustrated in FIG. 1). The seal sleeve retention surface 33 prevents seal sleeve 20 from sliding out of housing 16. The receiver interconnector embodiment illustrated in FIG. 6 has an open rabbet at the end of the extensions on the housing, with additional internal radial surfaces to prevent the seal sleeve from sliding out of the housing during decoupling.

FIG. 2 illustrates a longitudinal cross-sectional view of a first embodiment of valve interconnector 14, which comprises neck 64, valve assembly 66, and coupling retention flange 68. Neck 64 has internal neck surface 70 and external neck surface 72. Internal neck surface 70 defines primary longitudinal passageway 65 through neck 64. Neck 64 has internal neck end 74 for coupling, and external neck end 76 for attaching first hollow body (illustrated schematically by reference number 15 in FIG. 3) valve interconnector 14.

Valve assembly 66 is inside the longitudinal passageway 65 through neck 64. Valve assembly 66 comprises valve head 78, valve stem 86, valve retainer 82, valve spring 80, and valve seat 84. Valve spring 80, which is around valve stem 86, is used to bias valve head 78 away from valve retainer 82 and toward valve seat 84. Valve head 78, valve stem 86, valve retainer 82, and valve spring 80 are all within the primary passageway through neck 64. Valve head 78 is moveable from a closed position as illustrated in FIG. 2, to an open position as illustrated in FIG. 3, via the sliding of valve stem 80 within valve retainer 82. Valve retainer 82 is illustrated in cross-sectional end-view in FIG. 2 and FIG. 3. Valve retainer 82 is a rectangular bar across the interior of passageway 65 through neck 64. Coupling retention flange 68 includes coupling retention surface 88 extending radially outward from neck 64.

The combination of FIG. 1 and FIG. 2 together illustrate interconnector system 10 in an uncoupled configuration in which valve head 78 is in the closed position with valve head 78 being biased into sealing contact with valve seat 84. Seal sleeve 20 is in the uncoupled position with inner sealing surface 56 of seal sleeve 20 in sealing contact with first sealing surface 50 and second sealing surface 52 on hollow post 18, thereby sealing closed radial passageways 46. On each flap member 58, outer locking lugs 60 are positioned in closed decoupling notches 32 in housing 16. In this manner, inner locking lugs 62 are far enough apart to allow coupling retention flange 68 to be inserted inside seal sleeve 20.

FIG. 3 illustrates interconnector system 10 in its coupled configuration. Valve head 78 is in the open position with the valve head 78 being separated from valve seat 84. Valve head 78 is held in the open position by the closed end 36 of hollow post 18. Seal sleeve 20 is in the coupled position leaving open radial passageways 46 through wall 48 of hollow post 18. Inner locking lugs 62 on flexible flap members 58 extend inward of the outermost surface of retention flange 68 to contact coupling retention surface 88 to hold valve interconnector 14 inside receiver interconnector 12 while the interconnector system is in its coupled configuration.

With the interconnector system in the coupled configuration and assuming liquid is flowing from the first hollow body 15 to the second hollow body 13, liquid flows through longitudinal passageway 65 through neck 64, past valve retainer 82, past valve stem 86, through the gap between valve head 78 and valve seat 84, around and past closed end 36 of hollow post 18, through radial passageways 46 in wall 48 of hollow post 18, through longitudinal passageway 38 through hollow post 18, out open end 34 of hollow post 18, and into the second hollow body 13.

In contrast, with the interconnector system in its uncoupled configuration as illustrated in the combination of FIG. 1 and FIG. 2, the liquid in the first and second hollow bodies is not free to flow through either receiver interconnector 12 or valve interconnector 14. Liquid in valve interconnector 14 is blocked from flow past valve assembly 66 because valve head 78 is biased into sealed engagement with valve seat 84. Liquid in receiver interconnector 12 is blocked from flow through radial passageways 46 in hollow post 18 because radial passageways 46 are blocked by sealing surface 56 of seal sleeve 20 with first sealing surface 50 on hollow post 18 being in sealed engagement with the sealing surface 56 of seal sleeve 20, and the second sealing surface 52 on hollow post 18 also being in sealed engagement with sealing surface 56 of seal sleeve 20.

During decoupling of valve interconnector 14 from receiver interconnector 12, the retraction of retention flange 68 applies force via the contact of retention surface 88 against inner locking lugs 62 to force seal sleeve 20 to slide from the coupled position as illustrated in FIG. 3 to the decoupled position illustrated in FIGS. 1 and 2. Retention flange 68 cannot be separated from seal sleeve 20 until outer locking lugs 60 move into decoupling notches 32. In order for outer locking lugs to move into closed decoupling notches 32, sealing surface 56 of seal sleeve must seal off radial passageways 46 to prevent leakage after decoupling. Thus, during decoupling, seal sleeve 20 is forced into a position in which sealing surface 56 seals off radial passageways 46 of hollow post 18, as otherwise decoupling cannot occur. This forced sealing off of radial passageways 46 during decoupling solves the problem experienced with the coupling of WO 00/76906, i.e., the problem of dried liquid adhering the outside of the hollow post preventing sealing off the radial passageways, allowing leakage to occur. The coupling of WO 00/76906 has the potential to decouple without a forced sealing off of the radial passageways, allowing leakage. The interconnectors of FIG. 1 and FIG. 2 employ a different mechanism for sealing off the radial passageways, with seal sleeve 20 necessarily sealing off radial passageways 46 in order to accomplish decoupling, a significant advance over WO 00/76906.

Figures 4, 5:
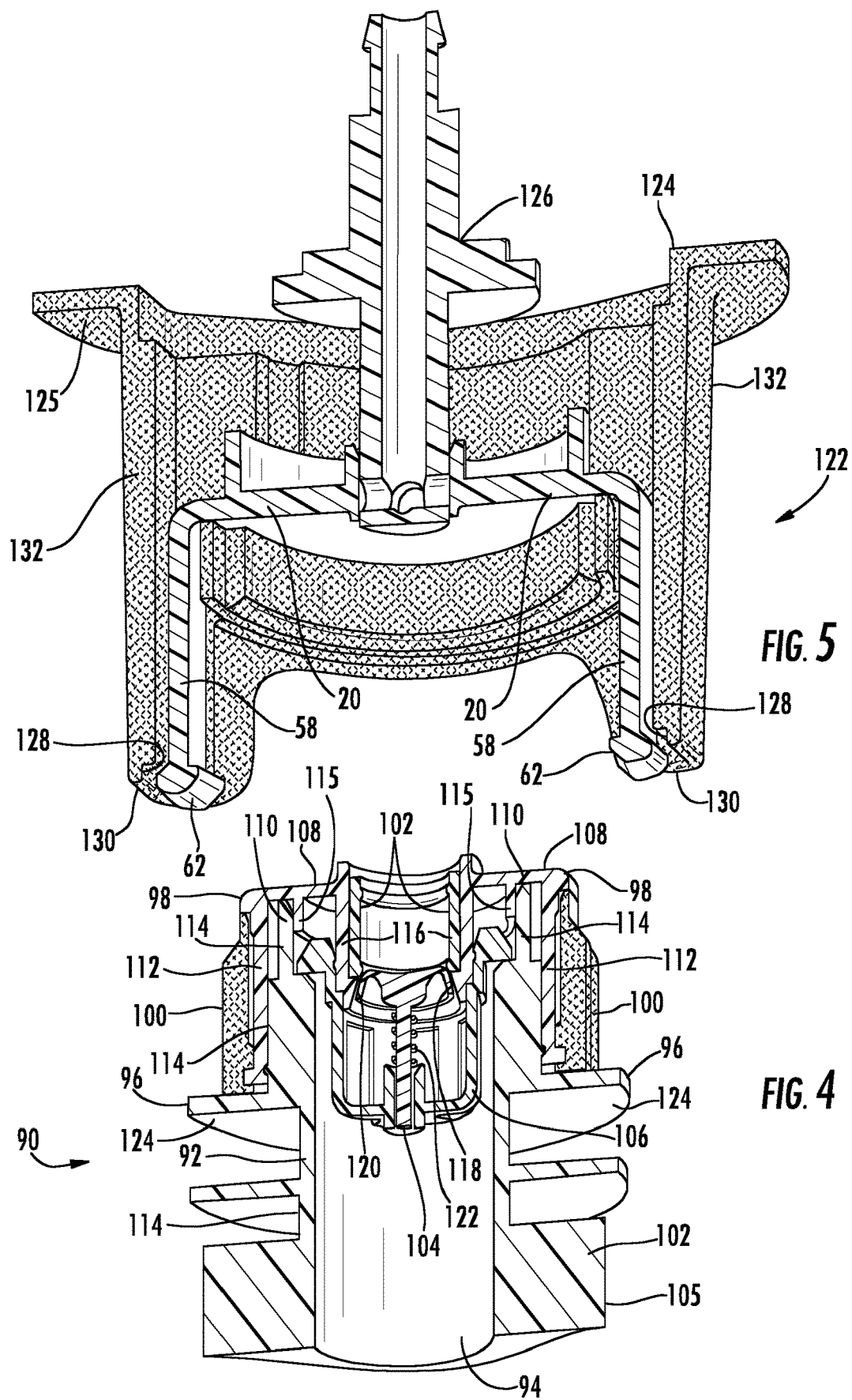
FIG. 4 is a perspective cut-away view of an alternative valve interconnector in an uncoupled configuration.
FIG. 5 is a perspective cut-away view of an alternative receiver interconnector in an uncoupled configuration.

FIG. 4 is a perspective cut-away view of a second embodiment of a valve interconnector 90, illustrated in its uncoupled configuration. Valve interconnector 90 comprises neck 92, longitudinal passageway 94, coupling retention flange 96, base cap 98, coded ring 100, and ribbed resilient sealing ring 102. Valve interconnector 90 further comprises a valve assembly having valve head 118 and integral valve stem 104, and liquid permeable (e.g., open-basket-style) valve retainer 106 having a valve stem passageway therethrough in which valve stem 104 is slidably engaged. As used herein with respect to the valve retainer, the phrase "liquid permeable," means that the valve retainer has an open structure so that liquid passing between the valve seat and the valve head can readily pass through the valve retainer and onward through the longitudinal passageway through the neck.

Base cap 98 has radially extending base cap head portion 108 covering the internal end 110 of neck 92. Axially-extending base cap exterior tube portion 112 covers a portion of the exterior surface 114 of neck 92. Axially extending base cap interior tube portion 116 extends into primary longitudinal passageway 94. Interior tube portion 116 has end 118 at which the inside surface forms valve seat 120 which is in sealed contact with valve head 102 when the valve assembly is in its closed position as illustrated in FIG. 4.

Base cap 98 is secured to neck 92 by axially-extending base cap intermediate tube 115 sized to so that it press-fits into sealed engagement with the inside surface of neck 94, i.e., the surface surrounding passageway through neck 94. The press-fit seal between the outer surface of intermediate tube 115 and the inside surface of neck 94 prevents liquid from flowing over internal end 110 and out of the valve interconnector 90.

Valve retainer 106 is secured to the exterior surface of interior tube portion 116 of base cap 98. A portion of valve retainer 106 is between interior tube portion 116 of base cap 98 and inside surface of neck 92. Bias spring 122 is around valve stem 104 and between valve retainer 106 and valve head 102.

Outer end of neck 92 has hollow body bonding flange 102 having outer bonding surface 105 for securing the first hollow body (not illustrated) to valve interconnector 90. Coupling retention flange 96 includes coupling retention surface 124 extending radially outward from neck 92.

FIG. 5 illustrates a perspective cutaway view of receiver interconnector 122 which can be coupled and uncoupled with valve interconnector 90 illustrated in FIG. 4. In receiver interconnector 122, housing 124 and hollow post 126 are not in contact with one another. However, both mounting base 125 of housing 124 and hollow post 126 are to be connected to a support member (not illustrated) which is a separate component. Upon securing both housing 124 and hollow post 126 to the support member, hollow post 126 is in a fixed position relative to housing 124. Seal sleeve 20 is illustrated in its uncoupled position, with the outer locking lugs on lugged flap ends 62 of outwardly-biased flexible flap members 58 in decoupling rabbet-type notches 128 (i.e., "open" notches) located at ends 130 of extensions 132.

Figure 6:
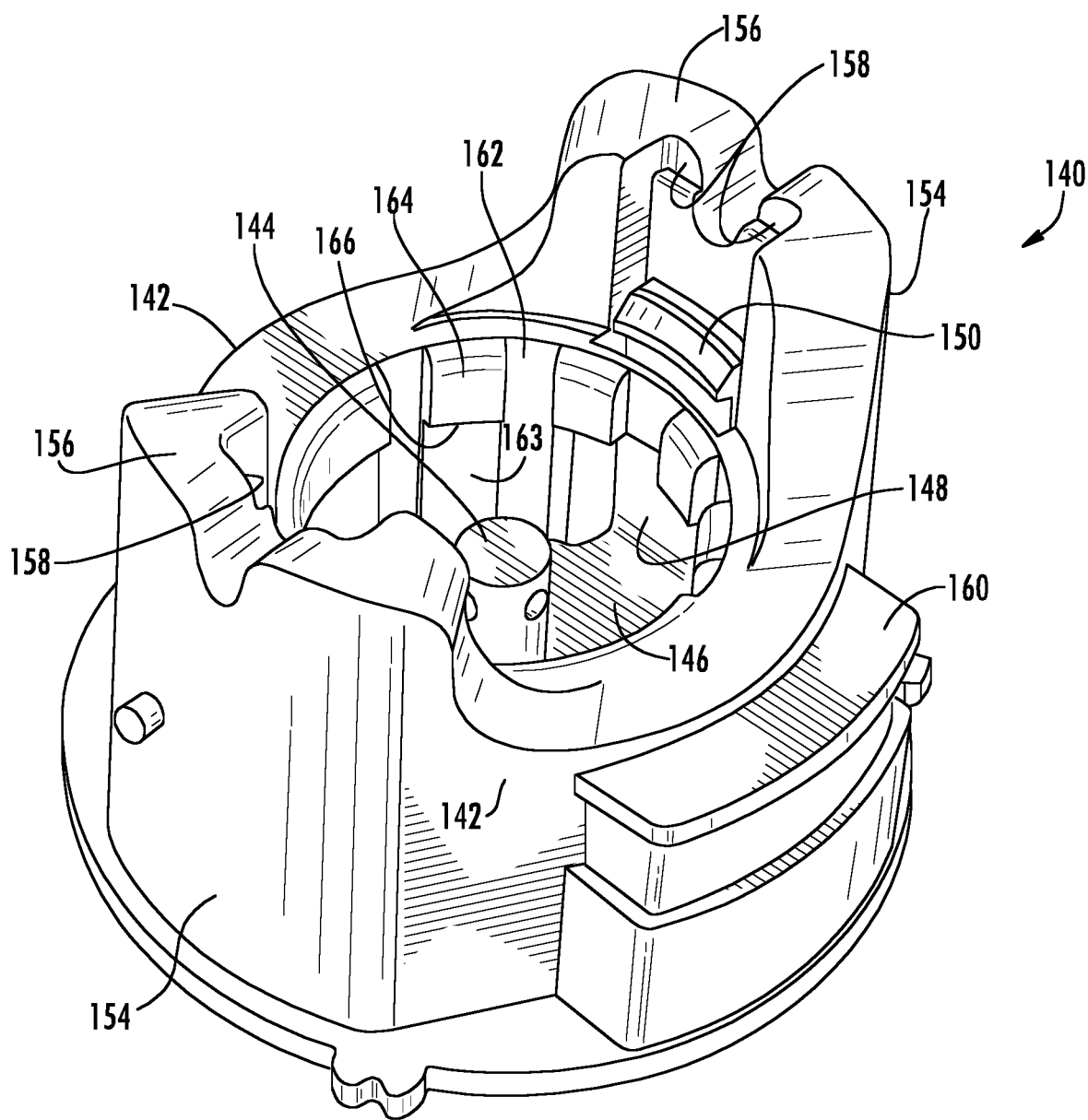
FIG. 6 is a perspective view of another alternative a receiver interconnector, illustrated in a coupled configuration but without a valve interconnector in place.

FIG. 6 illustrates a perspective view of receiver interconnector 140. Receiver interconnector 140 has housing 142, hollow post 144, and seal sleeve 146. Housing 142 has extensions 154 each terminating in receiving end 156 for receiving a valve interconnector such as valve interconnector 202 illustrated in FIG. 12B. Each receiving end 156 has open decoupling notch 158 (i.e., rabbet-type notch) therein. For illustration purpose, seal sleeve 146 is illustrated in its coupled position inside housing 142 (normally seal sleeve 146 would not be in this position unless coupled to a valve interconnector). Seal sleeve 146 has two axially extending, outwardly biased flexible flaps 148. Flaps 148 terminate in lugged ends 150, each end having both inner locking lugs and outer locking lugs. Push button 160 is a manual activation button which is part of a mechanism that locks seal sleeve 146 in its coupled position until it is desired to decouple the receiver interconnector from the valve interconnector.

In FIG. 6, the inside surface of housing 142 has a plurality of axially-oriented channels 162 and a plurality of axially-oriented ridges 163 between channels 162. Near their inward ends, axial ridges 163 each have radial riser surface 166 in the form of a radially-inward surface extending upward from ridge lower ridge level 163 to an upper ridge level 164. During decoupling, the head of seal sleeve 146 is sized to slide along lower level 163 until the inner surface of the head of seal sleeve 146 contacts radial surfaces 166 in the step from lower ridge level 163 to upper ridge level 164. This contact with radial surfaces 166 prevents seal sleeve 146 from sliding too far down hollow post 144, or even off the end of hollow post 144.

Figure 7:
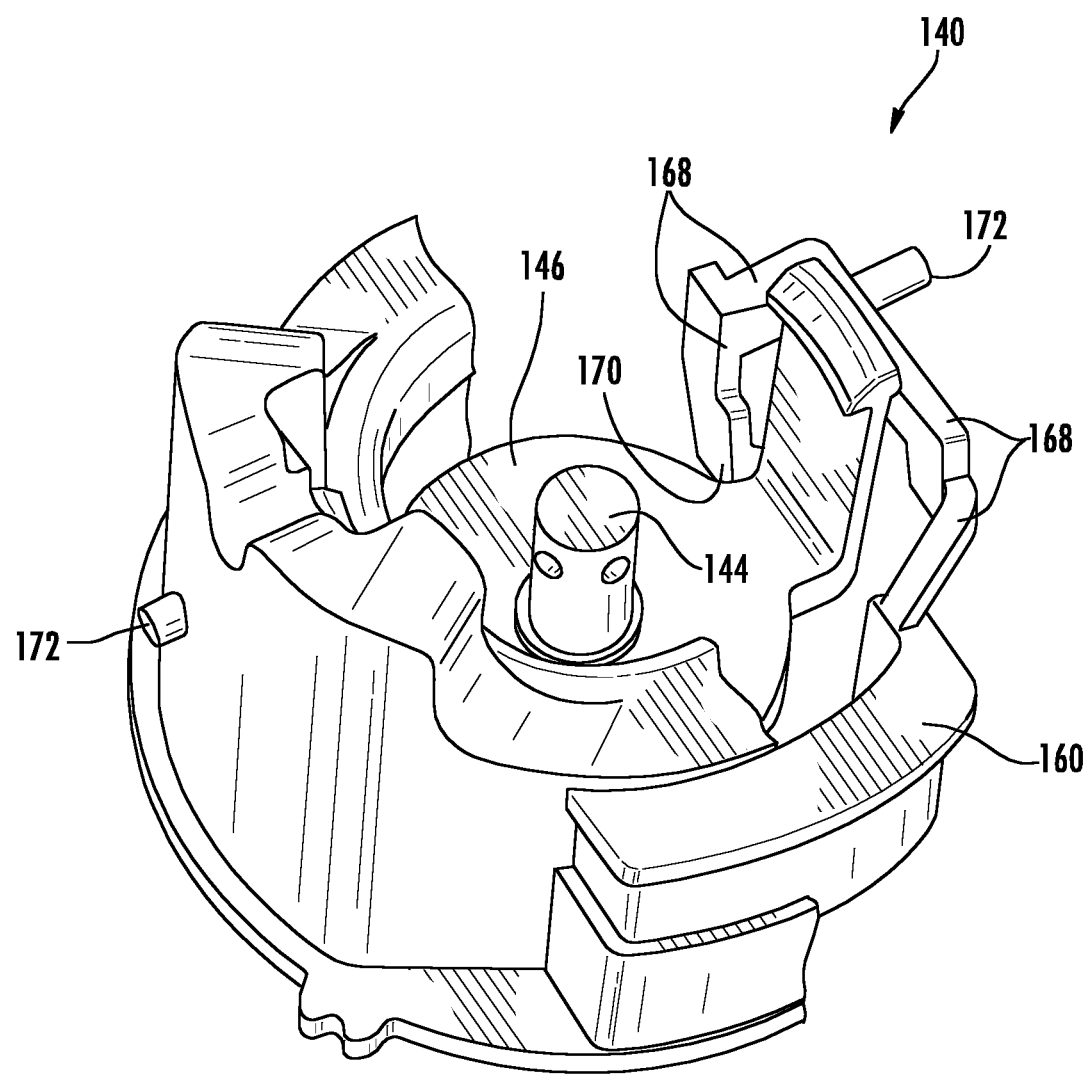
FIG. 7 is a cut-away perspective view of the receiver interconnector of FIG. 6.

FIG. 7 is a perspective cutaway view of the receiver interconnector 140 of FIG. 6. As can be seen in FIG. 7, push button 160 is integral with a rocker arm 168 terminating in a retention member in the form of a locking notch 170. Downward movement of push button 160 causes rocker arm 168 to pivot around pivot pin 172, causing locking notch 170 to disengage from the inward surface of the head portion of seal sleeve 146, thereby releasing seal sleeve 146 so that it can slide inward along hollow post 144 for decoupling of the valve interconnector from receiver interconnector 140.

Figure 8:
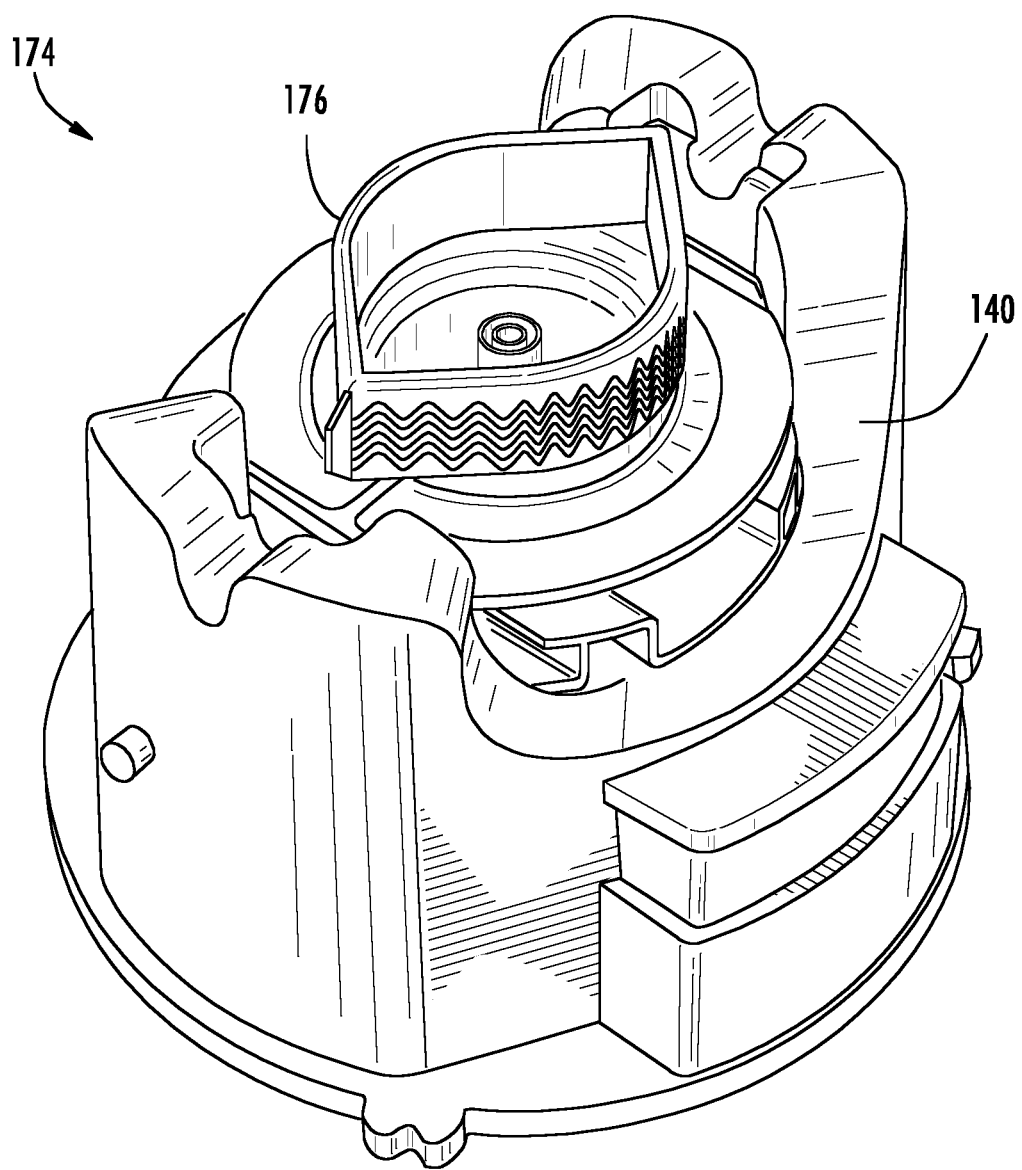
FIG. 8 is a perspective view of an interconnector system in coupled configuration, with the receiver interconnector being as illustrated in FIGS. 6, 7A, and 7B.
Figure 9:
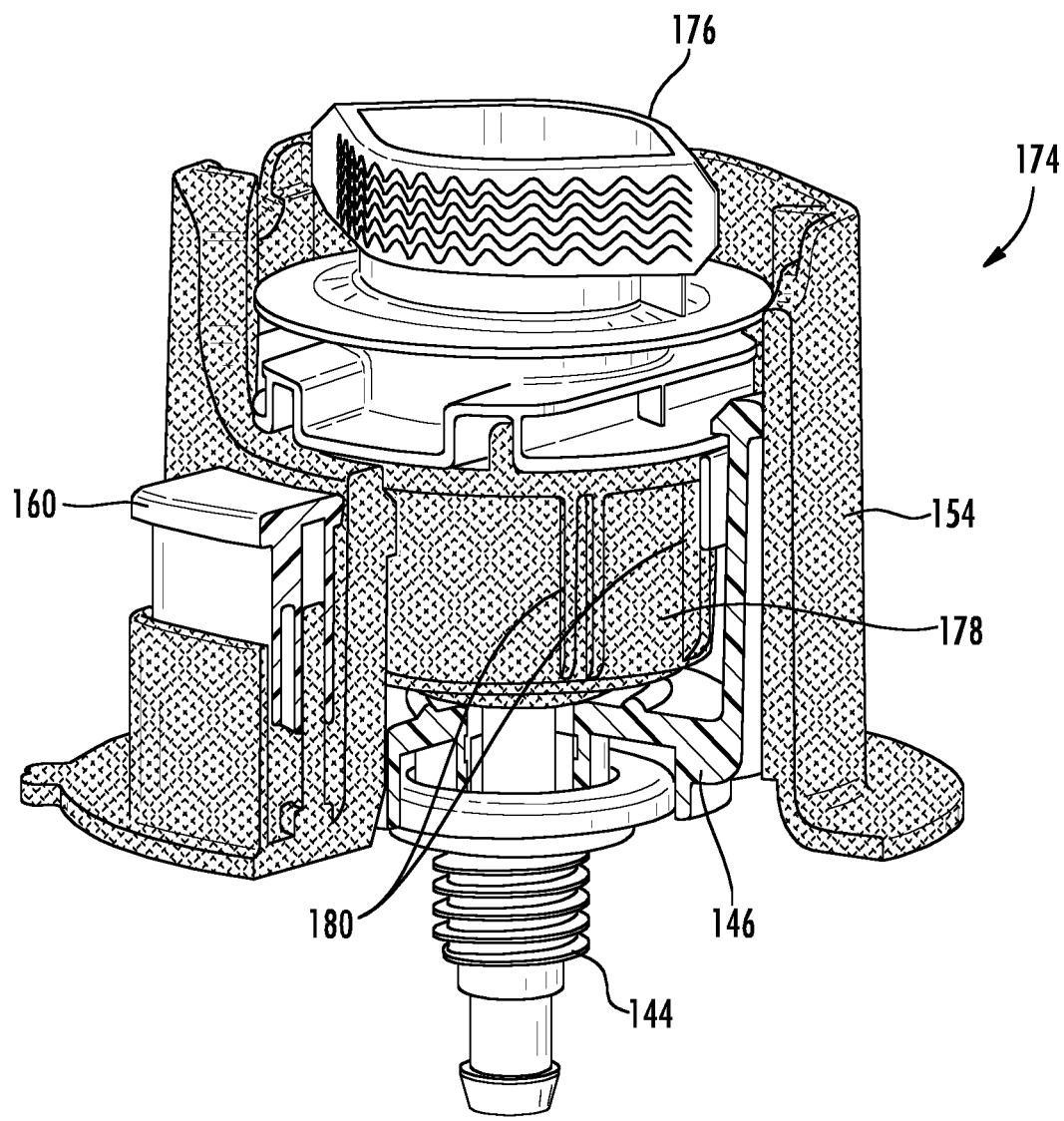
FIG. 9 is a perspective cut-away view of a coupled interconnector system.

FIG. 8 is a perspective view of coupled interconnector system 174 in which valve interconnector 176 is coupled within receiver interconnector 140. FIG. 9 is a perspective cutaway view of the coupled interconnector system 174, providing detail of the exterior structure of valve interconnector 176, including extension 154 and coded ring 178 having radial keys 180 extending from the outer surface of coded ring 178. The push button lock release pivot arms are not illustrated in FIG. 9.

Figure 10:
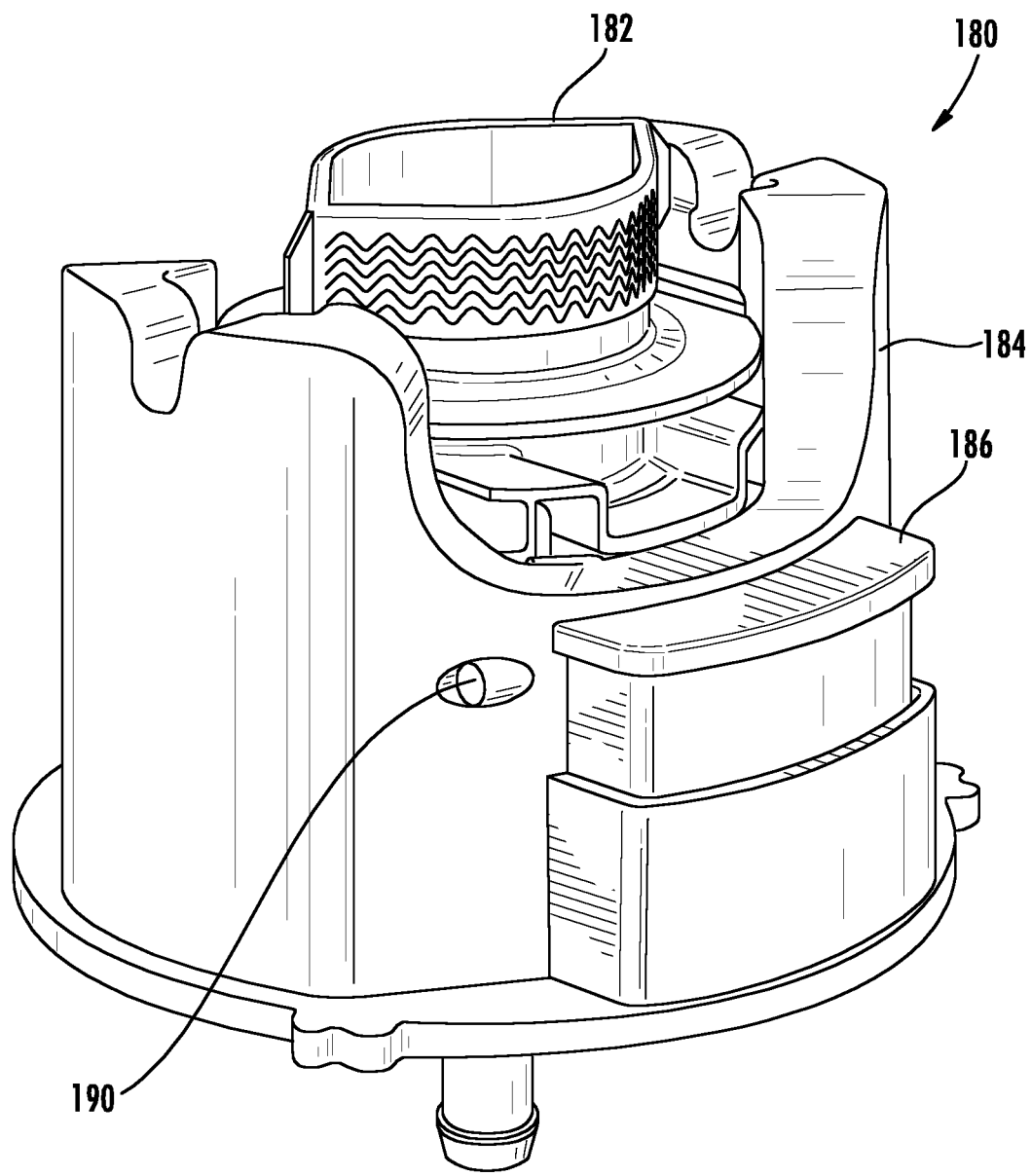
FIG. 10 is a perspective view of another embodiment of an interconnector system.

FIG. 10 is a perspective view of interconnector system 180 in a coupled configuration. Interconnector system 180 comprises valve interconnector 182 and receiver interconnector 184. Viewing FIG. 10 together with FIG. 11A and FIG. 11B (which are perspective cut-away views of the receiver interconnector 184 illustrated in FIG. 10), receiver interconnector 184 has push button 186 connected to rocker arm 188 which pivots around pin 190, which extends into rocker arm 188 and is integral therewith. Rocker arm 188 has locking notch 190 at the terminal end thereof, which locks over hooks 192 projecting from the head portion of seal sleeve 194 when seal sleeve 194 is in its coupled position, as it is in each of FIGS. 10, 11A, and 11B. As is illustrated by a comparison of FIGS. 11A and 11B, pushing down on push button 186 causes the terminal end of pivot arm 188, more particularly locking notch 190, to pivot inward towards hollow post 196 and away from hooks 192, thereby releasing hooks 192 so that seal sleeve 194 can slid up the inner portion of hollow post 196 during decoupling of the valve interconnector 182 from the receiver interconnector 184.

Figure 12A:
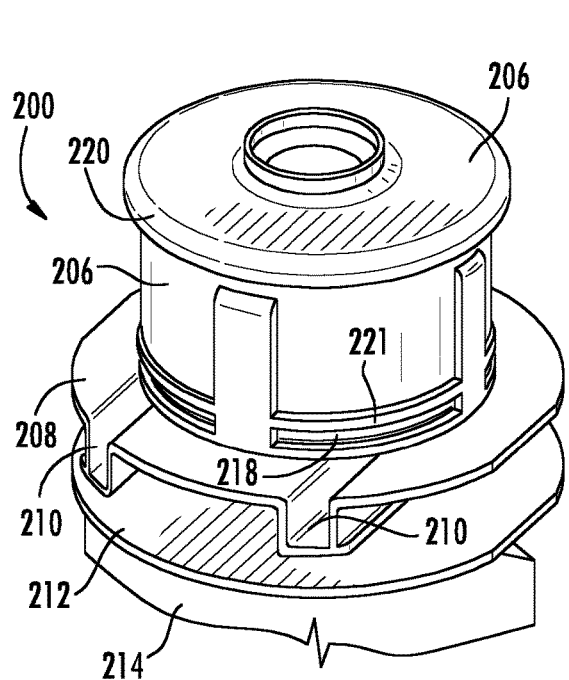
FIG. 12A is a perspective view of a valve interconnector without a coded ring.
Figure 12B:
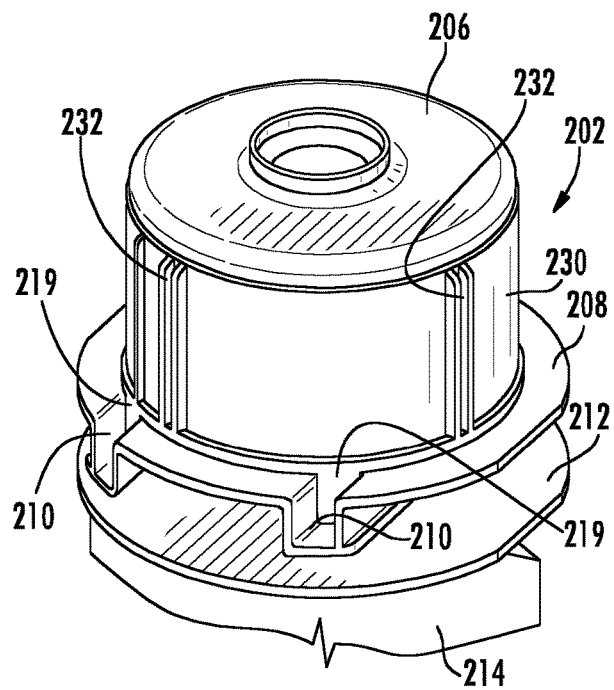
FIG. 12B is a perspective view of the valve interconnector illustrated in FIG. 12A, with a coded ring thereon.

FIG. 12A is a perspective view of a valve interconnector 200 without a coded ring thereon. FIG. 12B is a perspective view of valve interconnector 202 with a coded ring 230 thereon. Valve interconnectors 200 and 202 both have: (i) neck, (ii) base cap 206 secured over the inner end of neck, (iii) retention flange 208 having axial channels 210 therein, (iv) secondary flange 212, (v) bonding member providing bonding surface 214 for bonding first hollow body thereto. Base cap 206 has an annular groove (not illustrated) on an inside surface thereof, with the neck 204 (see FIG. 4) having integral annular ridge 218 (FIG. 12A) extending into the annular groove in the inside surface of base cap 206, allowing base cap 206 to snap fit into place over the end of the neck 204 (see FIG. 4). In FIG. 12B, coded ring 230 snap fits over annular radial extension 220 as well as over annular ridge 221 (see FIG. 12A) on the outside of base cap 206. Coded ring 230 has axial keys 219 on the outer edge thereof, with axial keys 219 extending into channels 210 in retention flange 208.

Figure 13:
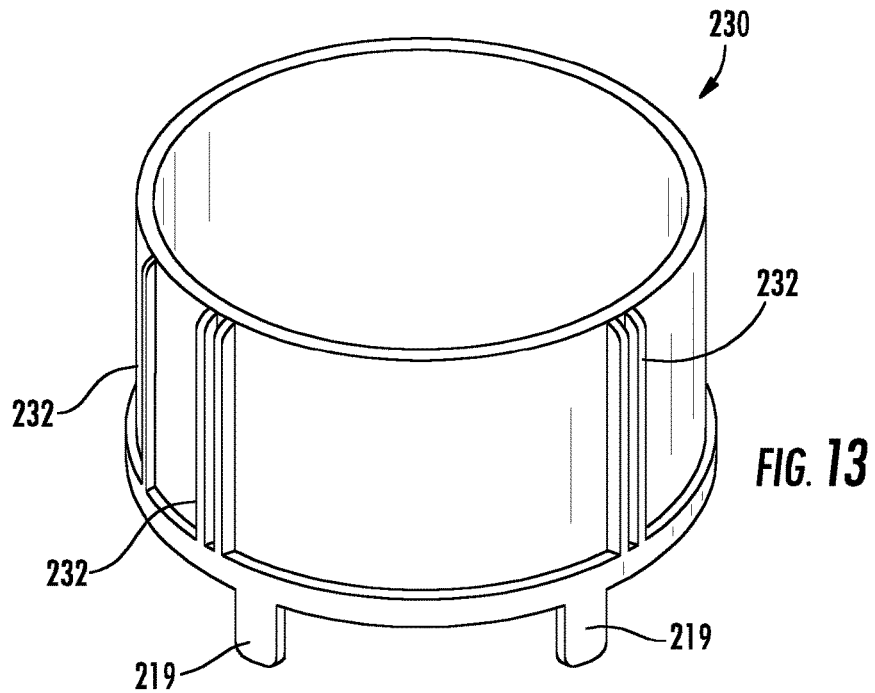
FIG. 13 is a perspective view of a coded ring.

FIG. 13 is a perspective view of coded ring 230 having radial keys 232 thereon and axial keys 219 thereon. In order to reduce the consumption of plastic, each key was designed as a pair of closely spaced ridges extending radially outward from the outer surface of the body of coded ring 230. A packaging article having a spout bonded to the bonding surface of the valve interconnector has a base cap which can be provided with a coded ring having a color matching the color of the housing of the receiver interconnector. In this manner, it is readily apparent which valve interconnector is to be coupled with which receiver interconnector. Moreover, capping a packaging article with a specific valve interconnector having a specific coded ring corresponding with the chemical in the package allows a worker to only hook up the package to a receiver interconnector having a slot pattern corresponding with the radial keys on the valve interconnector. This ensures that the desired product is transferred to the appropriate hollow body.

Axial keys 219 in FIG. 12B and FIG. 13 are sized and spaced to fit into axial grooves 210 in retention flange 208. Moreover, axial keys 219 are positioned relative to radial keys 232 so that upon installing coded ring 230 onto base cap 206, radial keys 232 have a desired orientation relative to the orientation of the hollow body, i.e., relative to the orientation of bonding surface 214. This allows the operator to know how to orient the hollow body attached to the valve interconnector without having to rotate coded ring 230 to ensure that radial keys 232 on the outer surface of coded ring 230 align with axially-extending channels 162 on the inside surface of housing 142 (see channels 162 in FIG. 6), for ease of coupling.

Figure 14A:
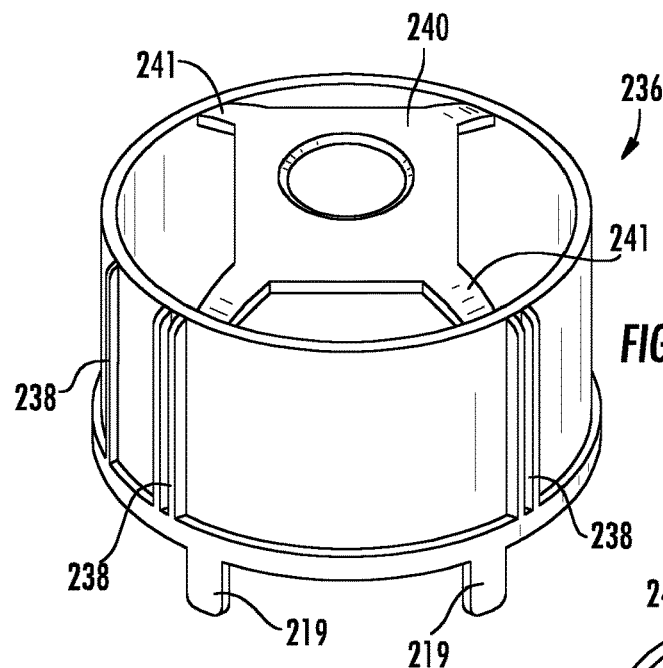
FIG. 14A is a perspective view of as first alternative coded ring.
Figure 14B:
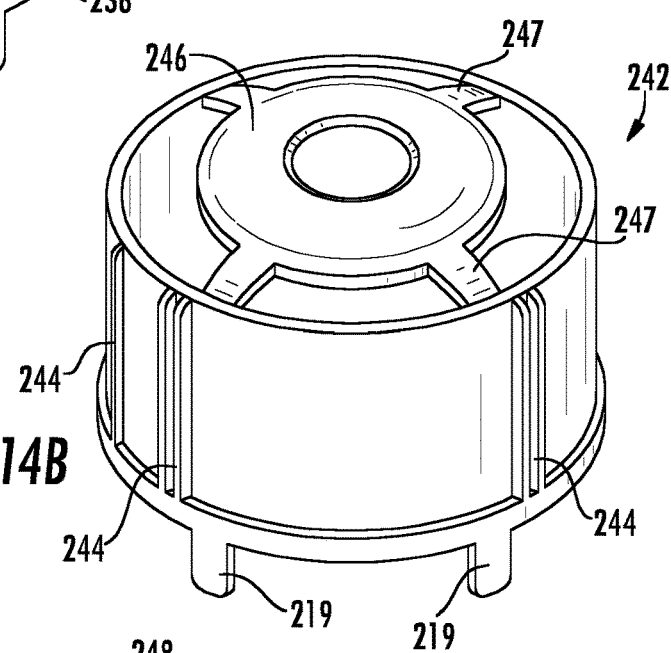
FIG. 14B is a perspective view of a second alternative coded ring.
Figure 14C:
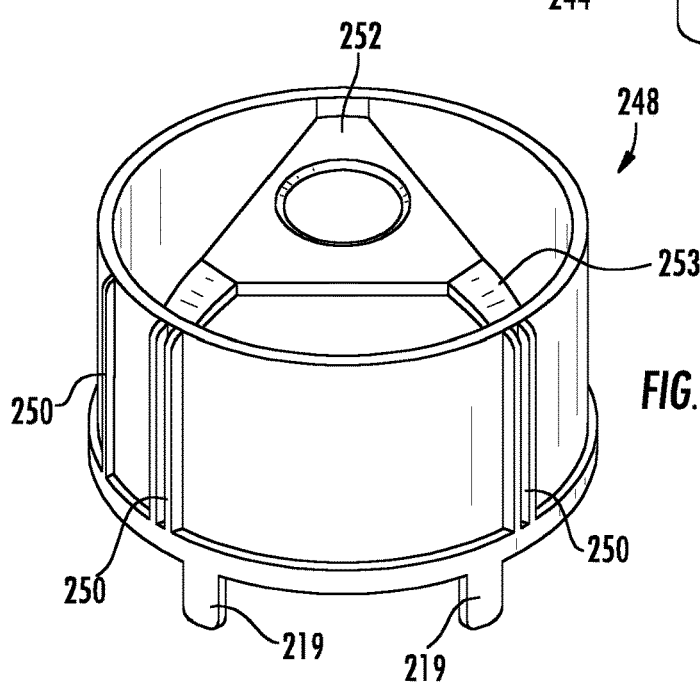
FIG. 14C is a perspective view of a third alternative coded ring.

FIG. 14A illustrates a perspective view of coded ring 236 having radial keys 238 and having axial key 240 in the form of square, plus four bridges 241. During coupling, the axial key is designed to mate with a keyway (i.e., a recess for square 240 and bridges 241) in the inside surface of the head portion of the seal sleeve of the receiver interconnector. FIG. 14B illustrates a perspective view of coded ring 242 having radial keys 244 and an axial key in the form of a circle 246 plus four bridges 247. FIG. 14C is a perspective view of coded ring 248 having radial keys 250 and having axial key in the form of a triangle 252 plus three bridges 253. Each of coded rings 236, 242, and 248 are provided with a pair of axial keys 219 sized, spaced, and positioned for insertion into axial channels 210 in retention flange 208 as illustrated in FIG. 12B.

The number and spacing of radial keys on the coded rings can be varied so that a different coded ring can be used in the packaging of each of a set of flowable products. With a coded ring having twelve locations for placing radial keys, and with a housing inner surface having twelve locations for corresponding axial slots, a total of 144 different key/slot combinations are available. If the number of different products to be dispensed is greater than this number, then the use of axial keys such as are illustrated in FIGS. 14A, 14B, and 14C can be used in combination with different radial key/axial slot combinations, to for example, triple the number of unique combinations of radial keys/axial slots plus axial keys, to ensure that each package is provided with a coded member having a set of radial and axial keys that corresponds with the product. The particular combination of radial and axial keys is designed to mate only with the corresponding receiver interconnector designated for dispensing the product.

Figure 15:
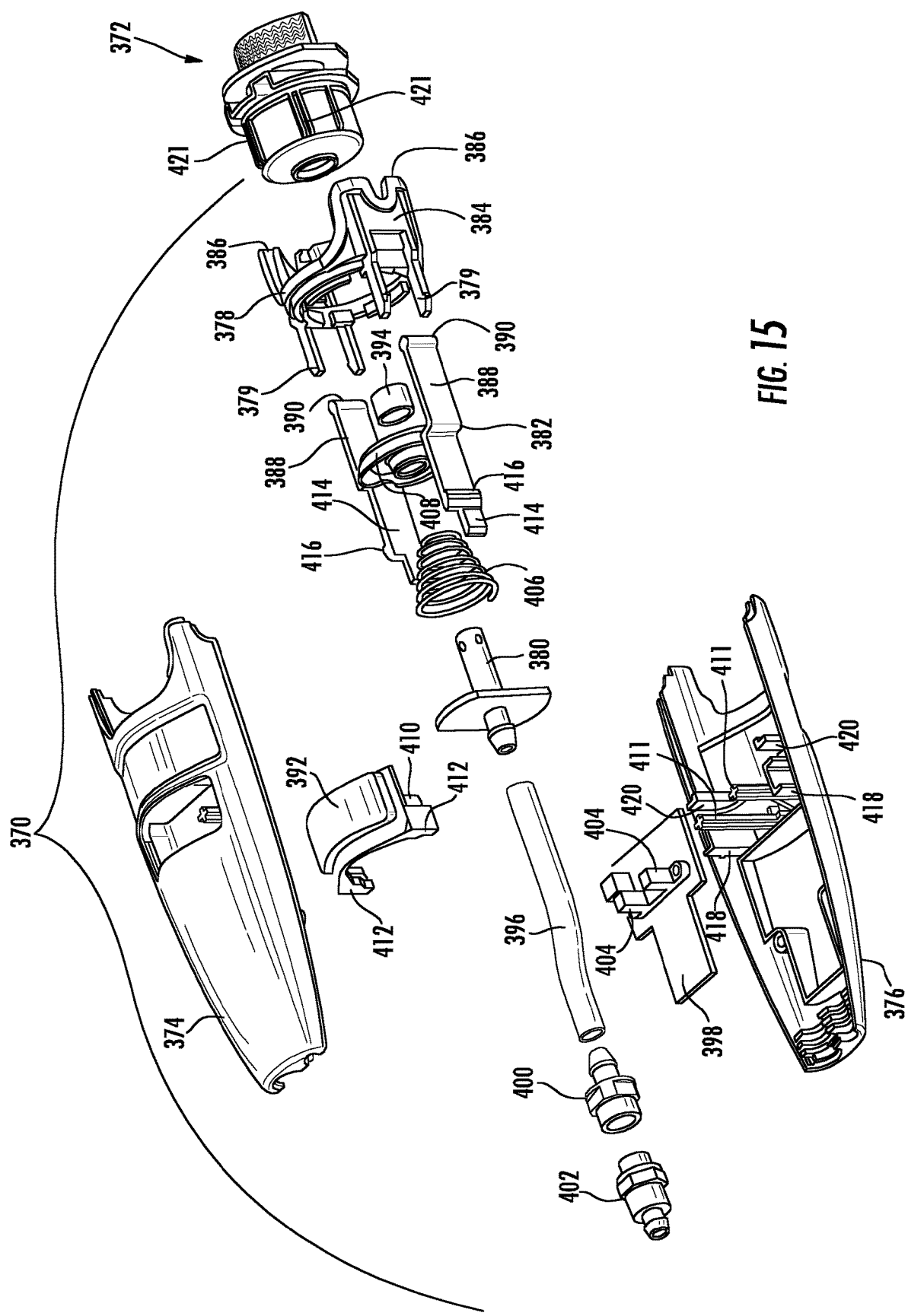
FIG. 15 is an exploded perspective view of a hand-held receiver interconnector.

FIG. 15 is a perspective view of an interconnector system including valve interconnector 372 fully assembled, and hand-held receiver interconnector 370 in exploded view, i.e., disassembled. Receiver interconnector 370 includes outer casing halves 374 and 376, receiver housing 378, hollow post 380, seal sleeve assembly 382, manual push button lock release mechanism 392, resilient sealing ring 394, transparent fluid conduit 396, internal mounting base 398, fluid flow adapter 400, fitment nozzle 402, flow sensor mount 404, and seal sleeve decoupling assistance spring 406. Flow sensor mount 404 has thereon an optical cell to indicate whether liquid is present in transparent conduit 396, to indicate when the hollow body is empty. Providing a liquid detecting device is useful in systems handling a liquid product where it is necessary or desirable to detect that the container has emptied and then shut off a pump and/or sound an alarm calling for the container to be replaced.

Figure 11A:
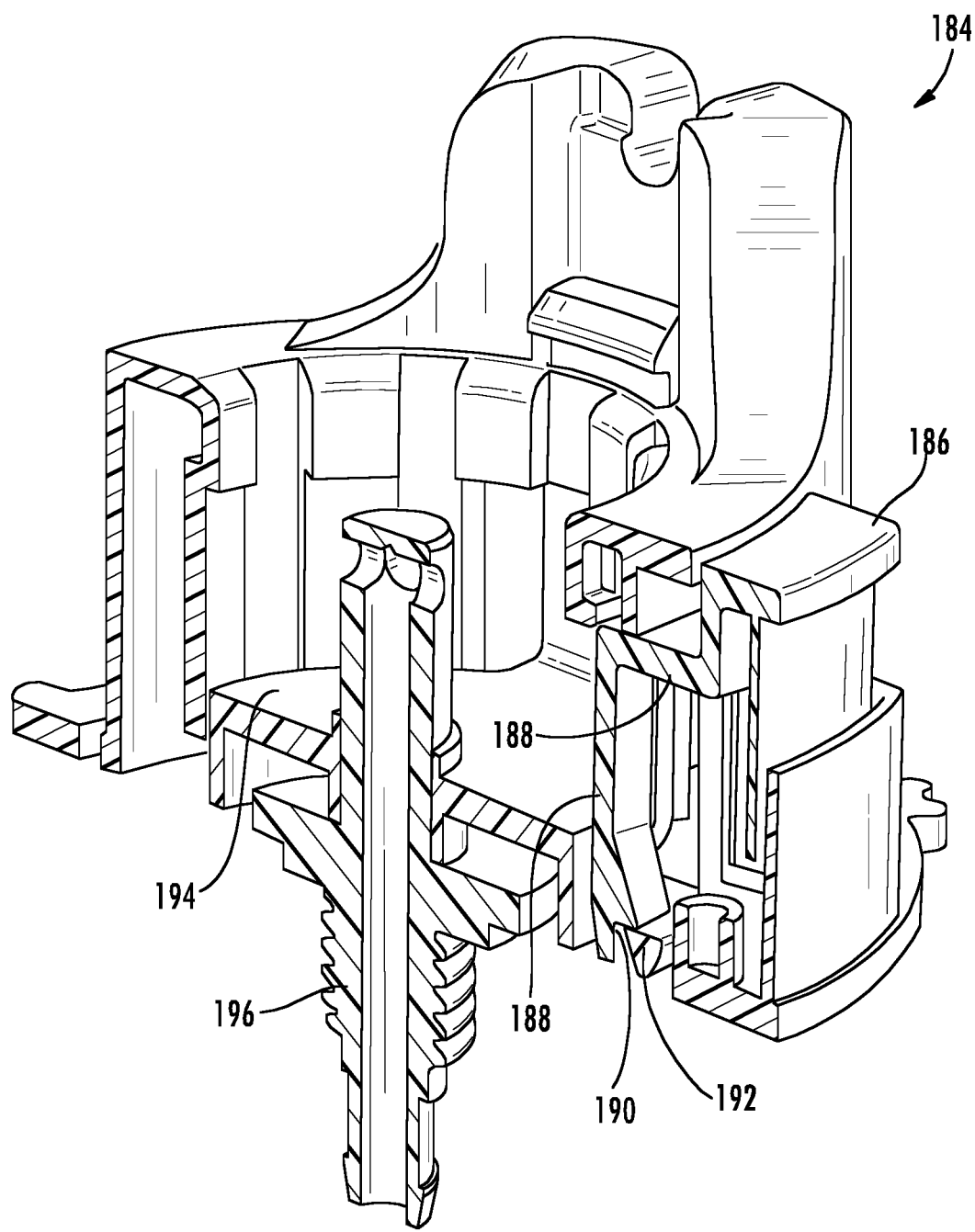
FIG. 11A is a perspective cut-away view of the receiver interconnector of FIG. 10 with a release mechanism in a first position.
Figure 11B:
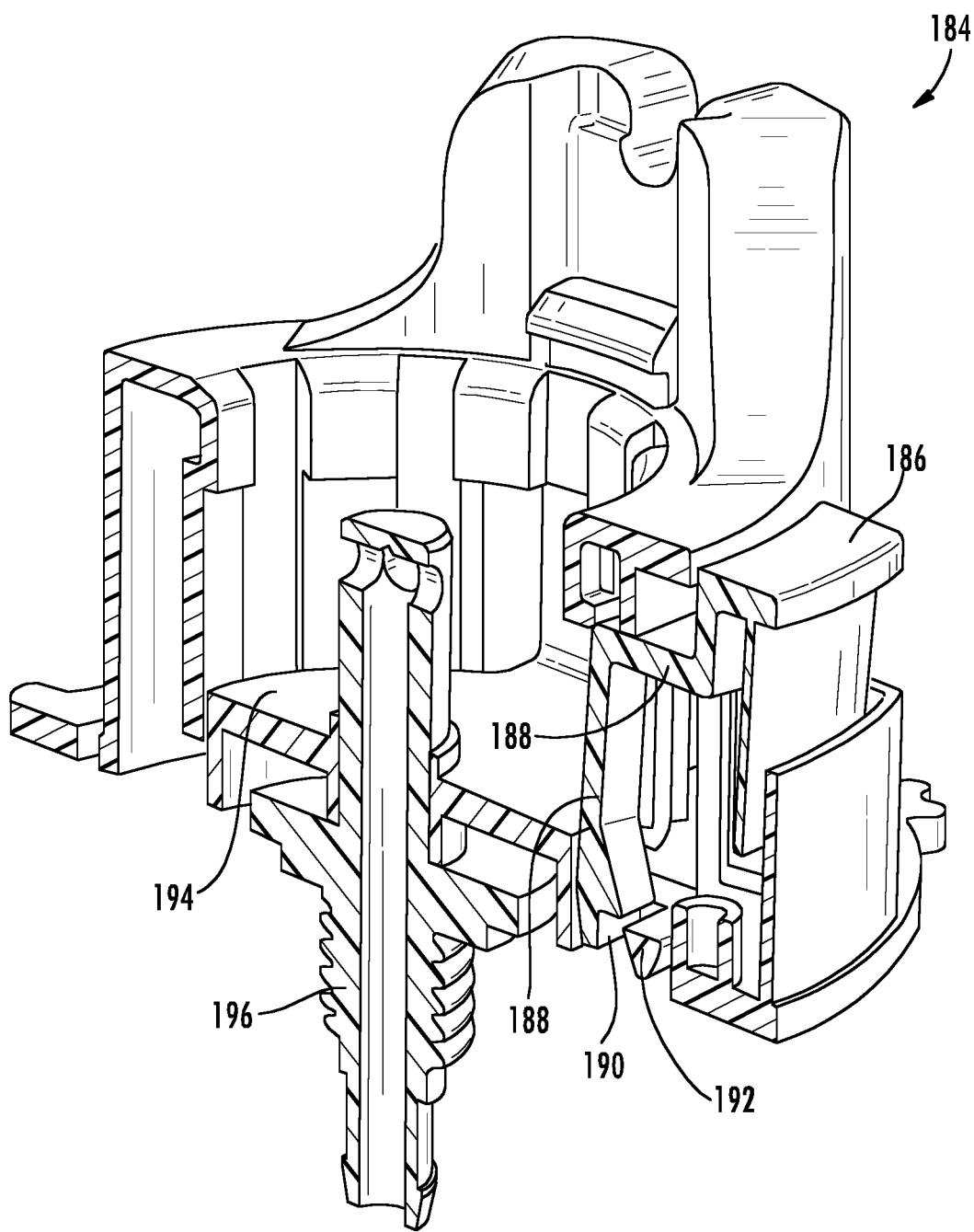
FIG. 11 B is a perspective cut-away view of the receiver interconnector of FIG. 10 with a release mechanism in a second position.

Viewing FIGS. 15, 16, 17A, and 17B together, housing 378 has extensions 384 each terminating in receiving end 386 for receiving valve interconnector 372. The inside surface of housing 378 has channels (not illustrated in FIG. 26, but as illustrated in FIGS. 6, 11A, and 11B) for receiving radial keys 421 extending from a coded ring. Seal sleeve 382 comprises seal sleeve head 408, axially extending, outwardly biased flexible flaps 388 terminating in ends 390 having both inner and outer locking lugs.

Push button lock release mechanism 392 has hollow mounting pins 410 (FIG. 15) that fit over guide pins 411 in casing 376. Push button 392 is biased into its disengaged position (e.g., with springs inside hollow pins 410) so that while the interconnectors are coupled, release arms 412 allow hooks 416 to be retained by locking wall 418 in casing 376. Downward movement of push button release mechanism 392 causes forces release arms 412 downward, in turn forcing seal sleeve locking arms 414 to flex inward, i.e., toward one another (see FIG. 17B for position of release arms 412 in the coupled position), thereby allowing locking arm hooks 416 to disengage from locking walls 418, allowing seal sleeve assembly 382 to be released and to slide up hollow post 380 into the decoupled position, with outer locking lugs on ends 390 of outwardly biased flexible flaps 388 moving into open decoupling notches on the inside surface of extensions 384 to allow valve interconnector 372 to be released from within receiver interconnector 370. As seal sleeve assembly 382 slides down hollow post 380 to the decoupled position, locking arm hooks 416 engage seal sleeve retaining walls 420 to prevent seal sleeve assembly 382 from sliding off the end of hollow post 380. See FIG. 17A.

Figure 16:
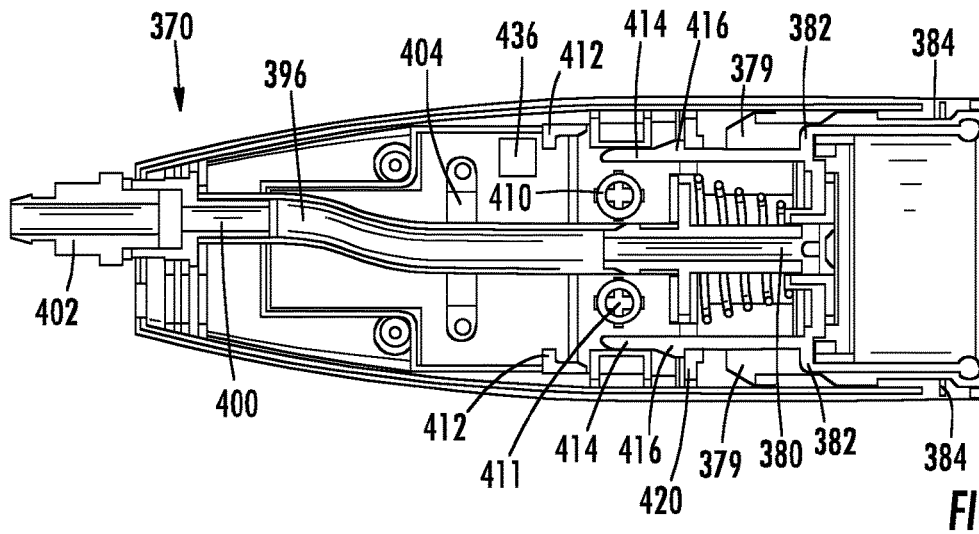
FIG. 16 is a longitudinal cross-sectional view of a hand-held receiver interconnector.
Figure 17A:
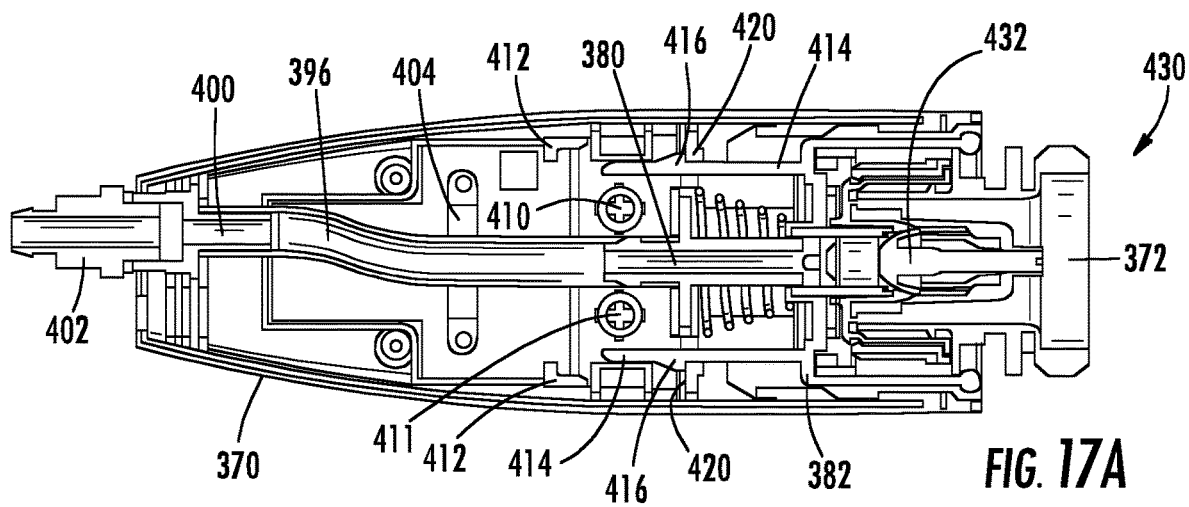
FIG. 17A is a perspective cutaway views illustrating the internal structure of an interconnector system utilizing a hand held receiver interconnector, in less than a fully coupled d configuration.

FIG. 16 illustrates a longitudinal cross-sectional view of assembled hand-held receiver interconnector 370, in its decoupled position, with locking arm hooks 416 of seal sleeve assembly 382 against seal sleeve retaining walls 420 in order to prevent seal sleeve 382 from sliding off hollow post 380. FIG. 17A illustrates interconnector system 430 with valve interconnector 372 inserted into hand-held receiver interconnector 370 but not fully coupled. The sealing surface of seal sleeve 382 seals closed the radial passageways through the wall of hollow post 380, and valve 432 in valve interconnector 372 remains closed, i.e., in contact with the valve seat.

Figure 17B:
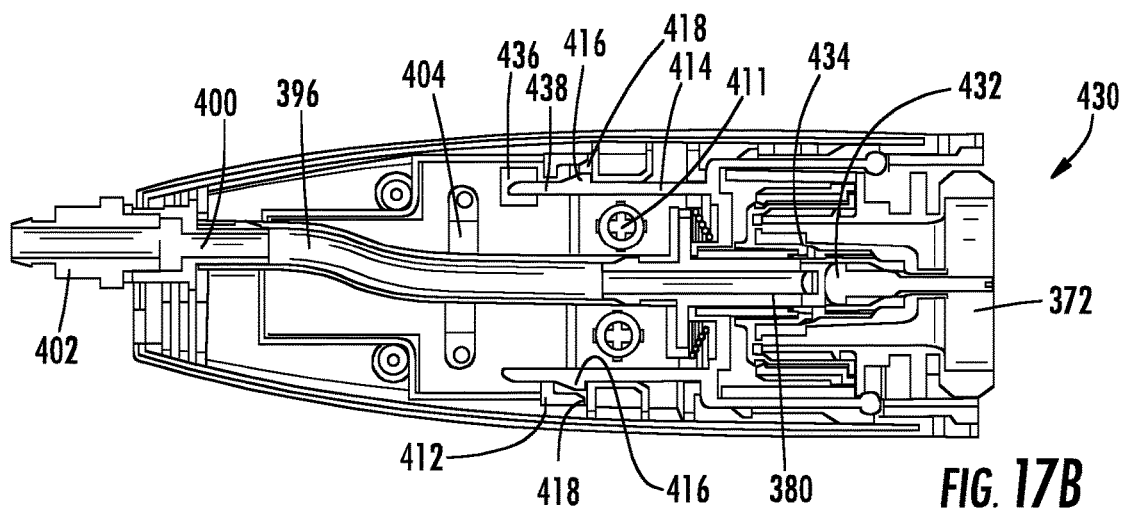
FIG. 17B is a perspective cutaway views illustrating the internal structure of an interconnector system utilizing a hand held receiver interconnector, in a fully coupled configuration.

FIG. 17B illustrates interconnector system 430 with valve interconnector 372 in fully coupled relationship with receiver interconnector 370, with locking arm hooks 416 against coupling lock walls 418, with the closed end of hollow post 380 holding valve 432 off of valve seat 434. FIGS. 16, 17A, and 17B together illustrate the coupling of the receiver interconnector with the valve interconnector. Disconnection is carried out by pushing down on button 392 (see to release locking arm hooks 416 (FIG. 17B), followed by retraction of valve interconnector 372 into the position shown in FIG. 17A, followed by full withdrawal of valve interconnector 372.

Figure 18:
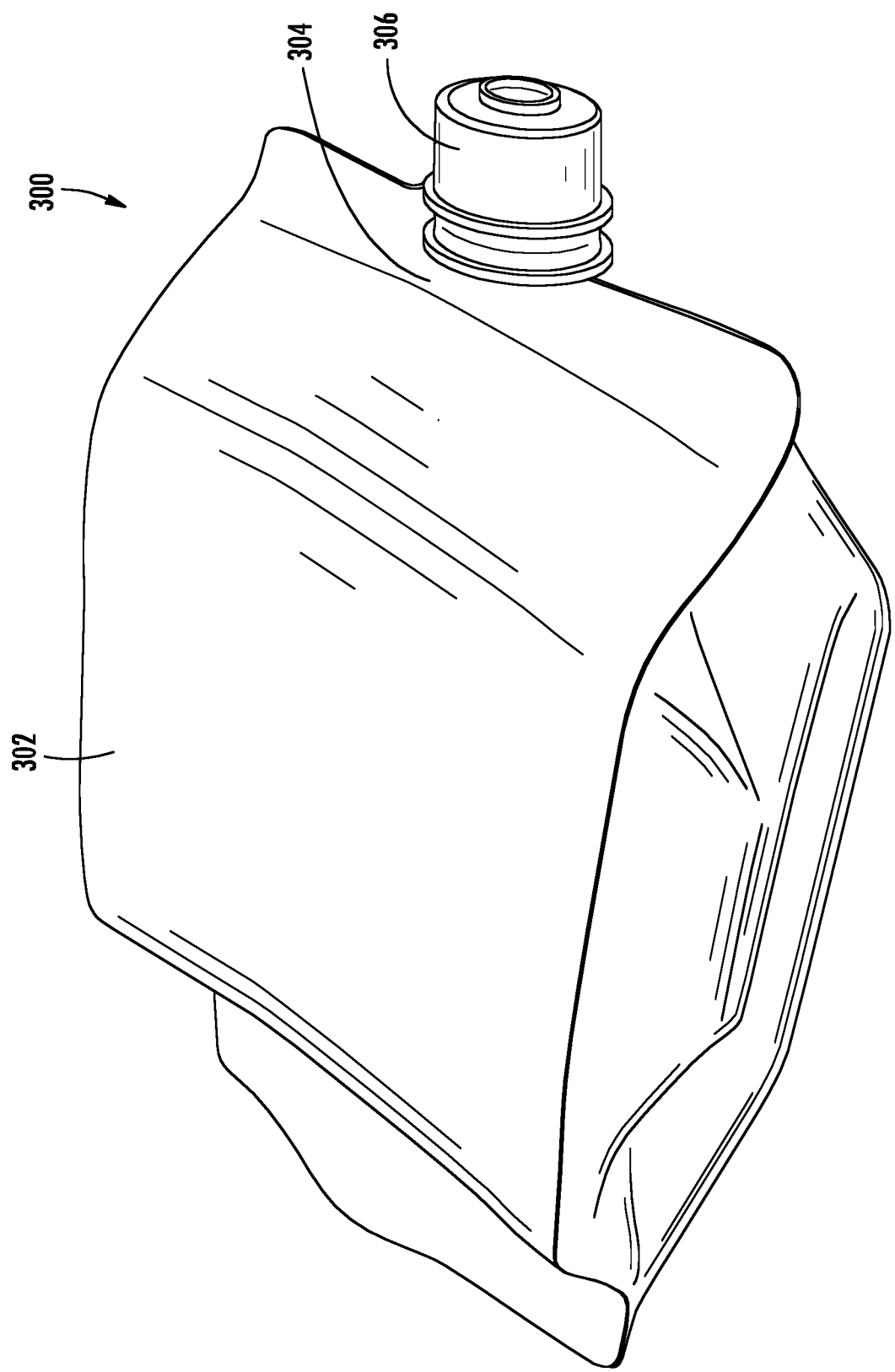
FIG. 18 is a perspective view of a hollow body having a spout bonded to a valve interconnector.

FIG. 18 is a perspective view of a hollow body/valve interconnector combination 300. The inside surface of hollow body 302 is heat sealed to the bonding surface on bonding flange 304 so that liquid can flow into or out of hollow body 302 through valve interconnector 306 if valve interconnector 306 is coupled with a receiver interconnector (not shown). Valve interconnector 306 can have all the features of valve interconnectors 200 and 202 illustrated in FIGS. 12A and 12B, respectively, as well as all of the features of valve interconnector 90 illustrated in FIG. 4.

Figure 19:
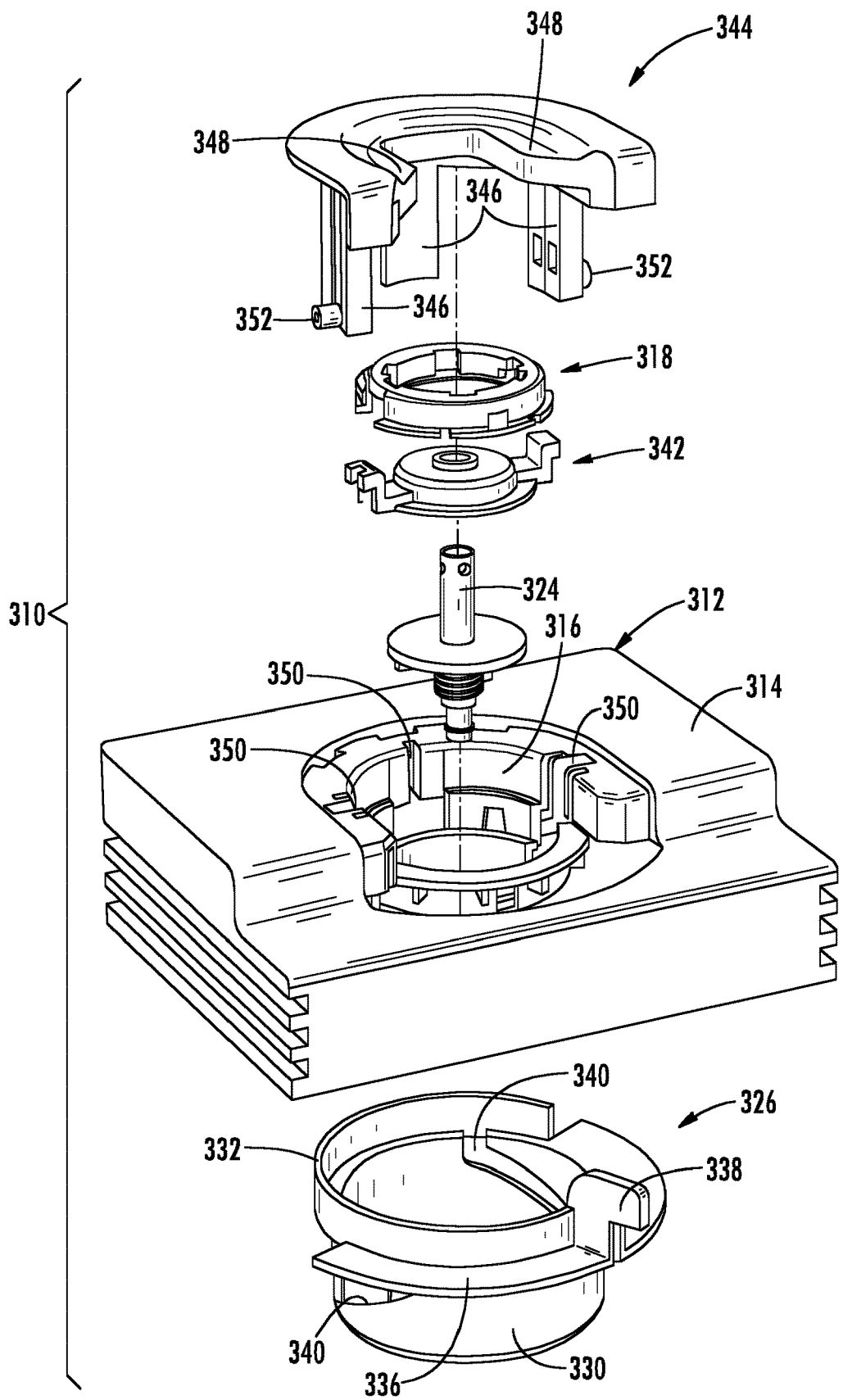
FIG. 19 is an exploded perspective view of an embodiment of a receiver interconnector.
Figure 20A:
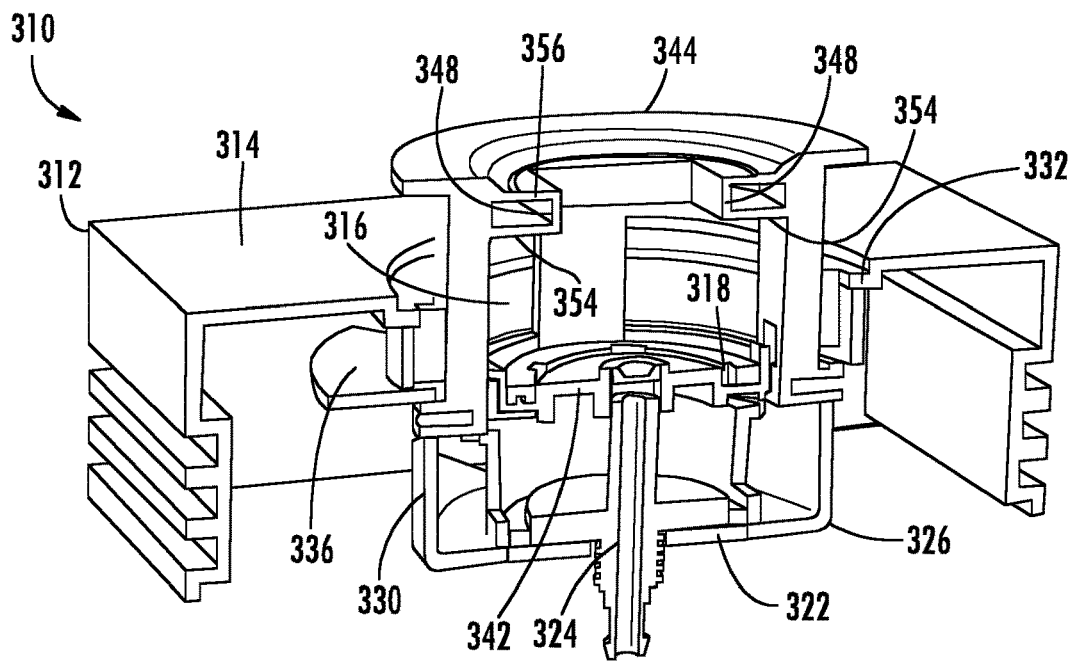
FIGS. 20A, 20B, and 20C illustrate perspective views in sequence from above, in the coupling of an interconnector system.

FIG. 19 is an exploded perspective view of an embodiment of receiver interconnector 310. FIG. 20A illustrates a cross sectional perspective view of assembled receiver interconnector 310, in its uncoupled configuration. Receiver interconnector 310 comprises housing 312 made up of a housing base member 314 having an axial extension 316 projecting downward from base member 314 to provide a recess for receiving valve interconnector 320 (see FIG. 20B). Housing 312 further includes housing adapter 318 fixedly secured to axial extension 316. Housing adapter 318 maintains a fixed position relative housing base member 314 and axial extension 316, but is made separately from base member 314 and extension 316 for purposes of ease of assembly and ease of design and assembly of additional component parts of receiver interconnector 310. The recess formed by axial extension 316 terminates in transverse mounting plate 322 (see FIG. 20A). Hollow post 324 is mounted in transverse mounting plate 322. Hollow post 324 extends upward into the recess formed by axial extension 316.

Receiver interconnector 310 further comprises rotatable elevator member 326 rotatably secured around outer surface 328 (see FIG. 21B) of axial extension 316 projecting from base member 314. Rotatable elevator member 326 comprises arcuate axial wall 330 having top edge 332 contacting a surface 334 of housing 312 from which the outer surface 328 of axial extension 316 extends. Rotatable elevator member 326 further comprises radial shelf 336 extending outward from the arcuate axial wall 330. Radial shelf 336 has manually-actuatable rotation tab 338 extending therefrom. Arcuate axial wall 330 of elevator member 326 also has helical guideways 340 therein.

Receiver interconnector 310 further comprises a slidable retainer/seal sleeve assembly comprising seal sleeve component 342 and retainer component 344, which are fixedly secured to one another so that they maintain a fixed position relative to one another as they slide together from their uncoupled position to their coupled position, and back again. Seal sleeve component 342 and retainer component 344 are made as separate parts for ease of manufacture and assembly of receiver interconnector 310. Moreover, as is apparent in FIGS. 19, 20A and 20B, retainer component 344 is radially open for receiving the valve interconnector via a radial insertion (i.e., insertion perpendicular to the axis through the center of the passageway through interconnector 310), rather than via axial insertion as in receiver interconnector 180 of FIG. 6. Retainer component 344 has three axial guides 346 each of which slides in an axial direction within a corresponding axial recess 350 (see FIG. 19) in the axial extension 316 of housing 312. At least one of the axial guides 346 has a radial elevator protrusion (in the form of pins 352) extending outward therefrom. Pins 352 slide within the helical guideway 340 as elevator member 326 is rotated by manually pushing on tab 338. Retainer component 344 has two valve interconnector retention and movement keys 348 (i.e., mounting keys 348) having lower radial surface 354 and upper radial surface 356 which contact, respectively, first and second flanges 208 and 212 extending from the neck of valve interconnector 320. See FIG. 20C, in which valve interconnector is coupled to receiver interconnector 310.

Figure 22A:
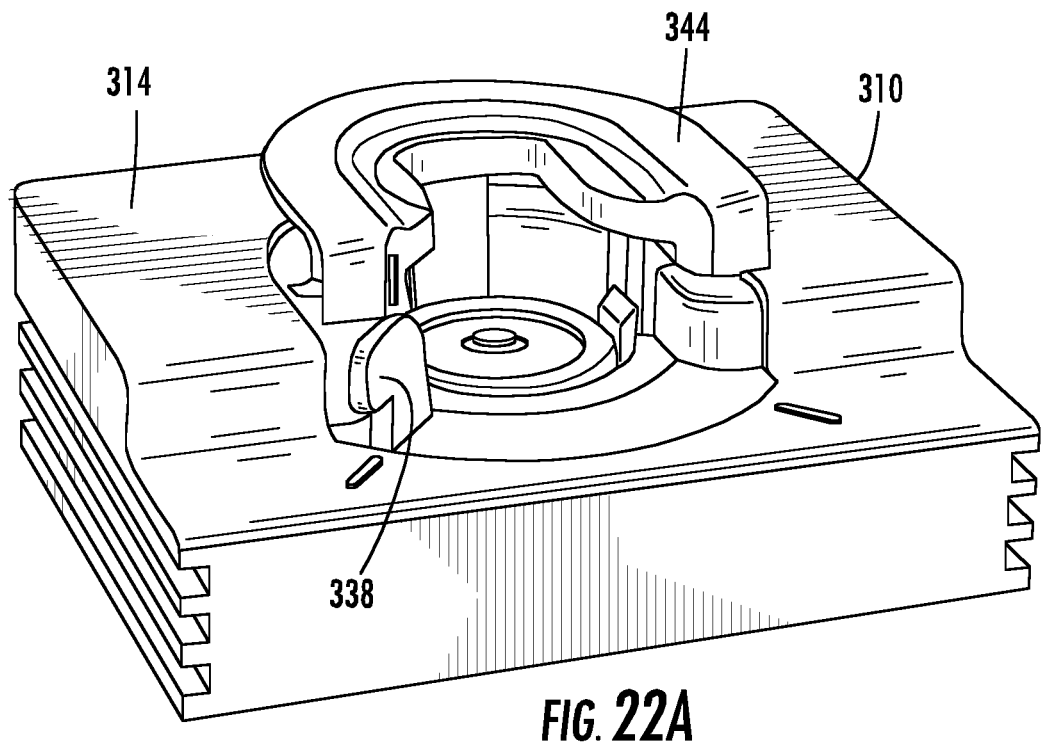
FIGS. 22A, 22B, 22C, and 22D are perspective cutaway views in sequence from above, of the process of bringing an interconnector system into a coupled configuration.
Figure 22B:
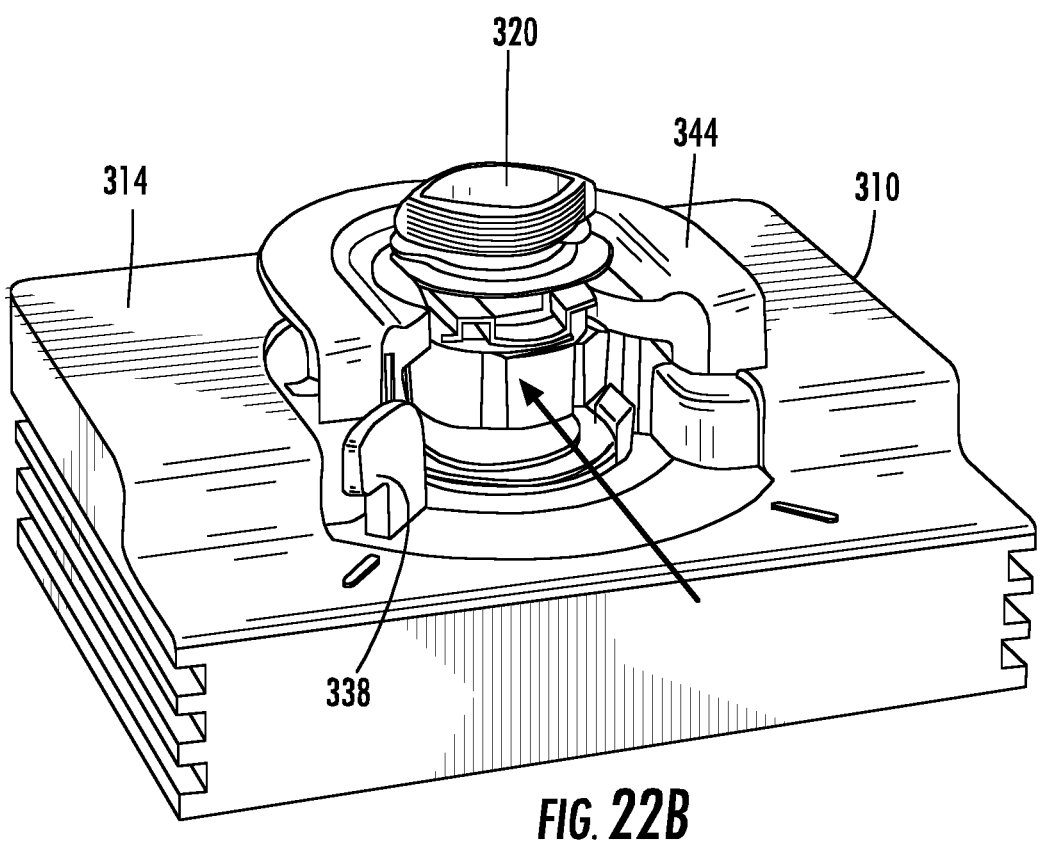
Figure 22C:
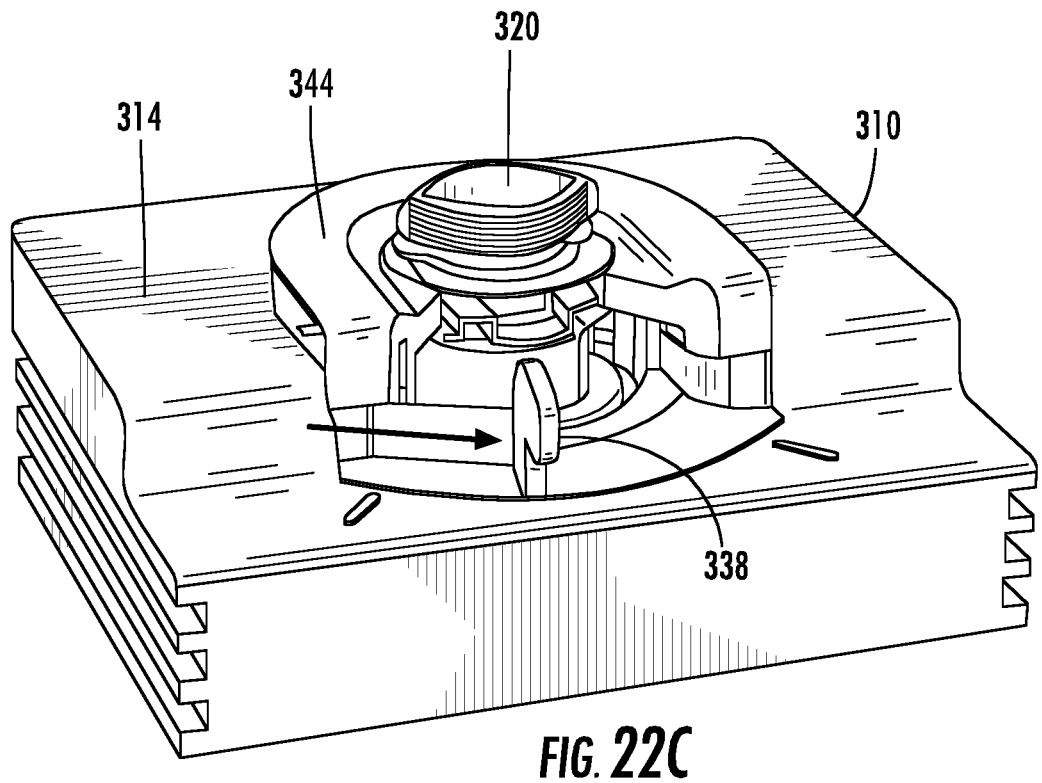
Figure 22D:
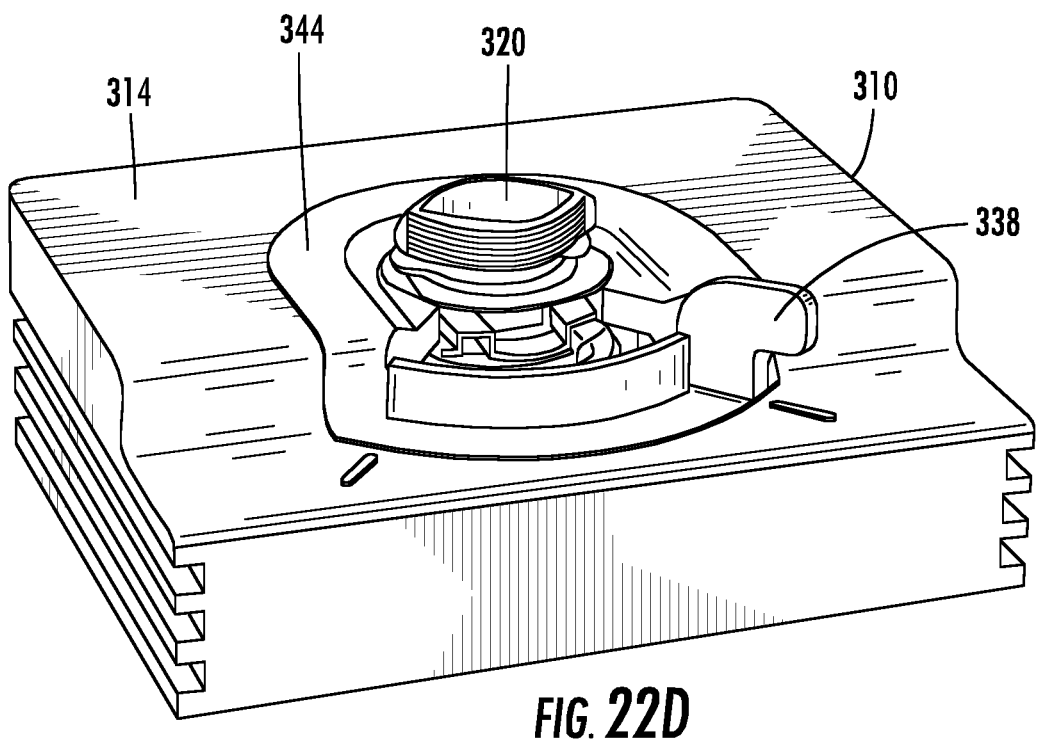

FIGS. 22A, 22B, 22C, and 22D, illustrate the process of inserting valve interconnector 320 into receiver interconnector 310 and thereafter coupling valve interconnector 320 with receiver interconnector 310. FIG. 22A illustrates tab 338 to the left with retainer 344 in the up position (decoupled position), ready to radially receive the valve interconnector. FIG. 22B illustrates the interconnector system after lateral insertion of valve interconnector 320 into receiver interconnector 310 (i.e., radial insertion, unlike the axial insertion utilized in receiver interconnector 140 of FIG. 6). However, in FIG. 22B the interconnectors are not coupled, i.e., retainer component 344 remains in the raised position relative to housing base member 314. Note elevator tab 338 in the left-most position in FIGS. 22A and 22B. In FIG. 22C, tab 338 has been rotated part way across toward the other side of radially open retainer component 344, causing retainer component 344 and valve interconnector 320 to move towards base member 314. Upon completing the movement of tab 338 to the other side (i.e., the right side) of the radial opening in retainer component 344, valve interconnector 320 is fully coupled into receiver interconnector 310, i.e., in the position illustrated in FIG. 22D. As tab 338 is moved to the right, inner sealing surface of the seal sleeve component 342 slides down hollow post 324 to open up the radial passageways through the wall of hollow post 324, i.e., the position illustrated in FIG. 20D, and extend hollow post 324 into the valve interconnector to open the valve by pushing the valve head away from the valve seat. In this manner, the interconnector system is coupled, and liquid can flow therethrough.

Figure 20B:
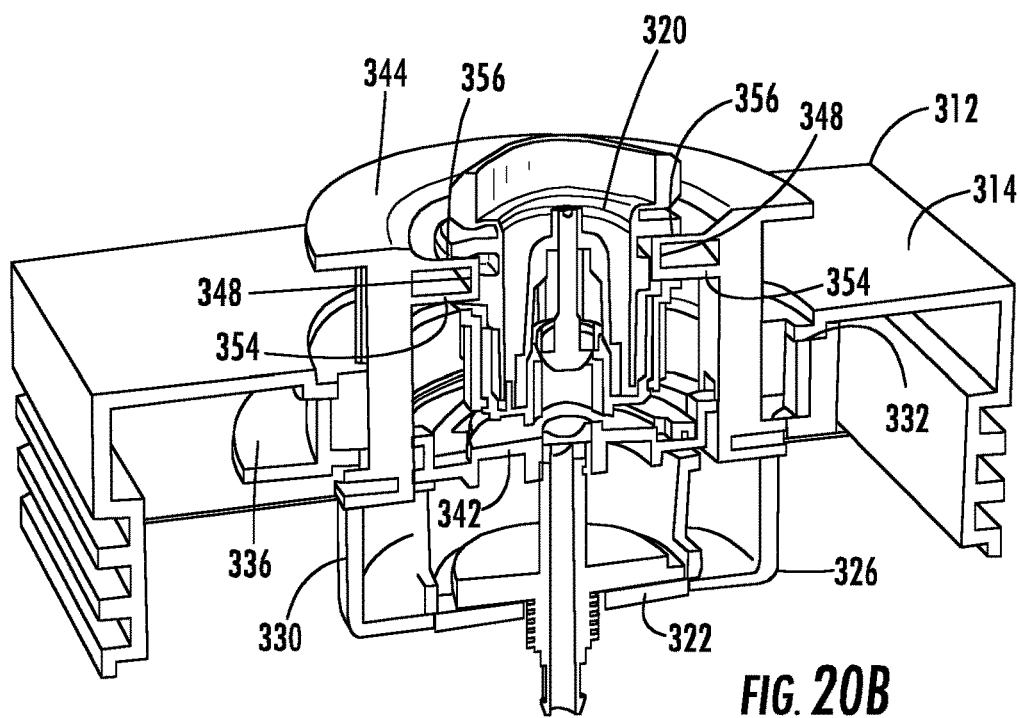
Figure 20C:
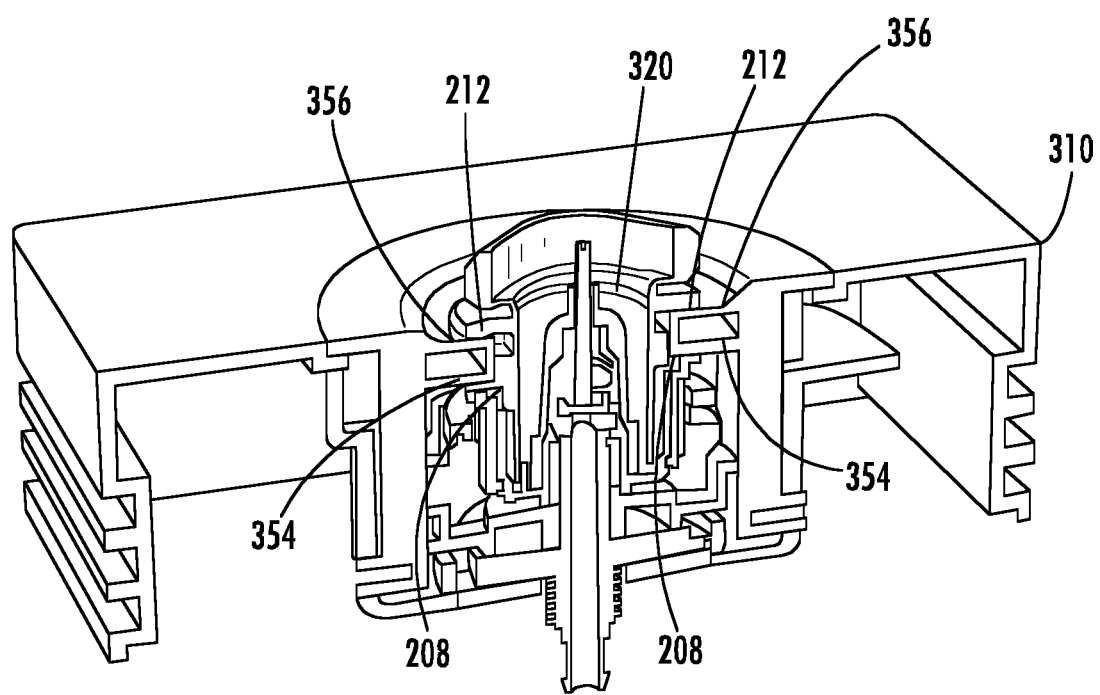
Figure 21A:
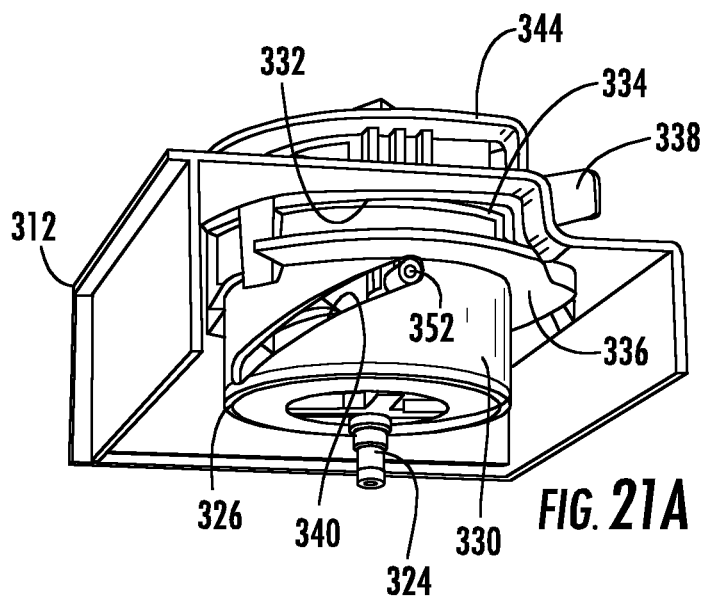
FIGS. 21A, 21B, and 21C are perspective views in sequence from below, in the coupling of an interconnector system.
Figure 21B:
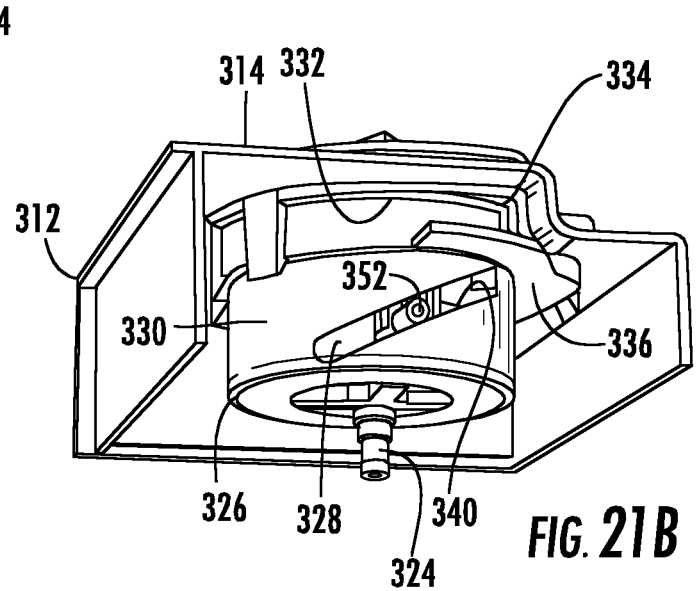
Figure 21C:
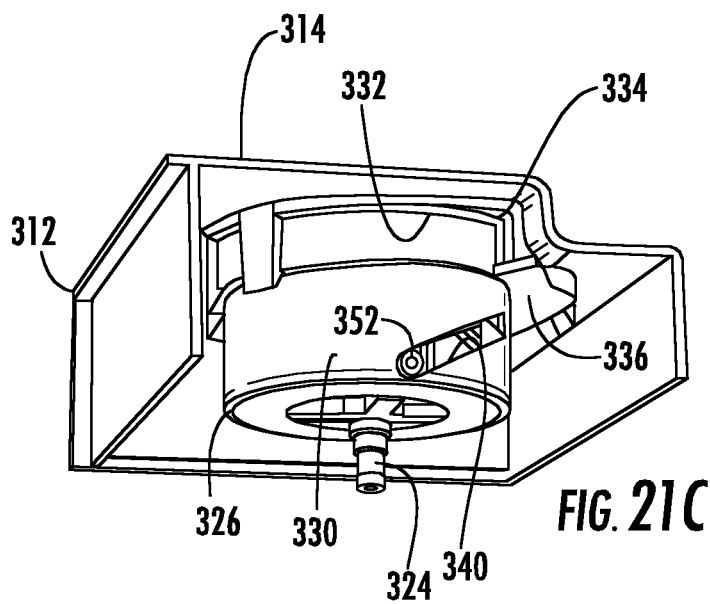

Moving tab 338 back to the left will elevate retainer component 344 and valve interconnector 320, decouple receiver interconnector 310 from valve interconnector 320 and allow the valve to return to its biased position against the valve seat, and return the inner sealing surface of the seal sleeve component 342 to the position sealing off the radial passageways through the wall of hollow post 324, i.e., the position illustrated in FIG. 20B.

Housing adapter 318 has an inside surface with channels (i.e., keyways) and ridges aligning with radial keys on coded ring on valve interconnector 320, similar to the channels and in the manner illustrated in FIGS. 6 and 12B. As also described above, retainer component 344 and/or housing adaptor 318 and/or housing 312 can be provided with a color matching the color of the coded ring. As described above, the coded ring can have a head portion provided with an axial key, with seal sleeve component 342 being provided with an inward surface having an axial keyway matching the axial key in the head portion of the coded ring. See FIGS. 14A-14C, discussed above.

Figure 23A:
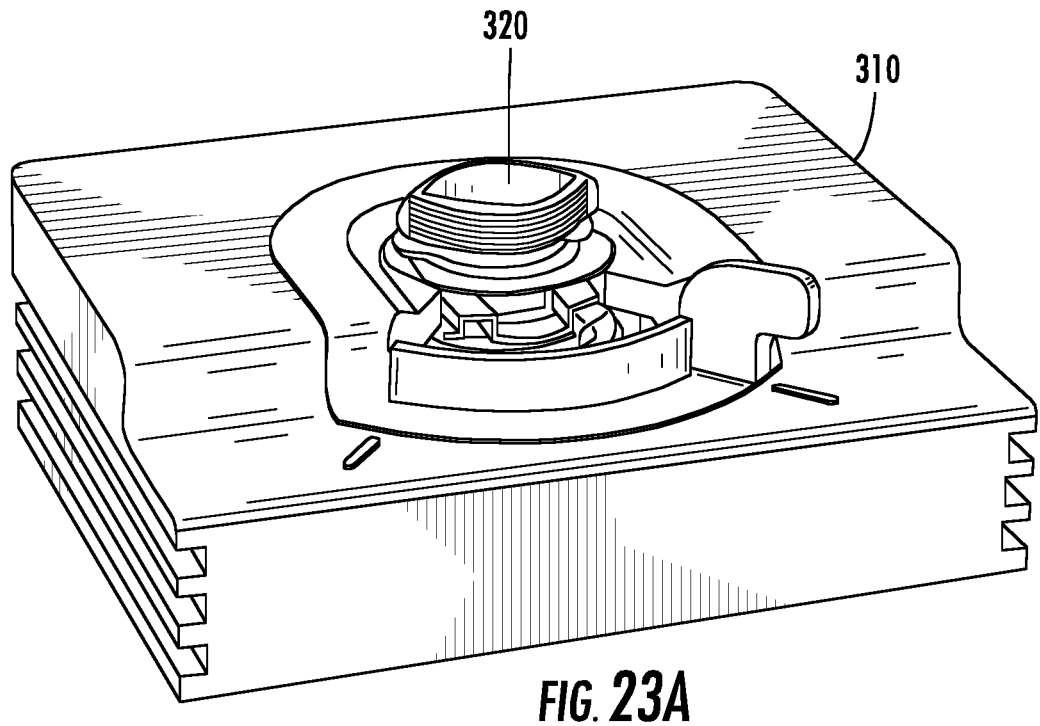
FIG. 23A is a perspective view of a coupled interconnector system with the receiver interconnector beneath the valve interconnector.
Figure 23B:
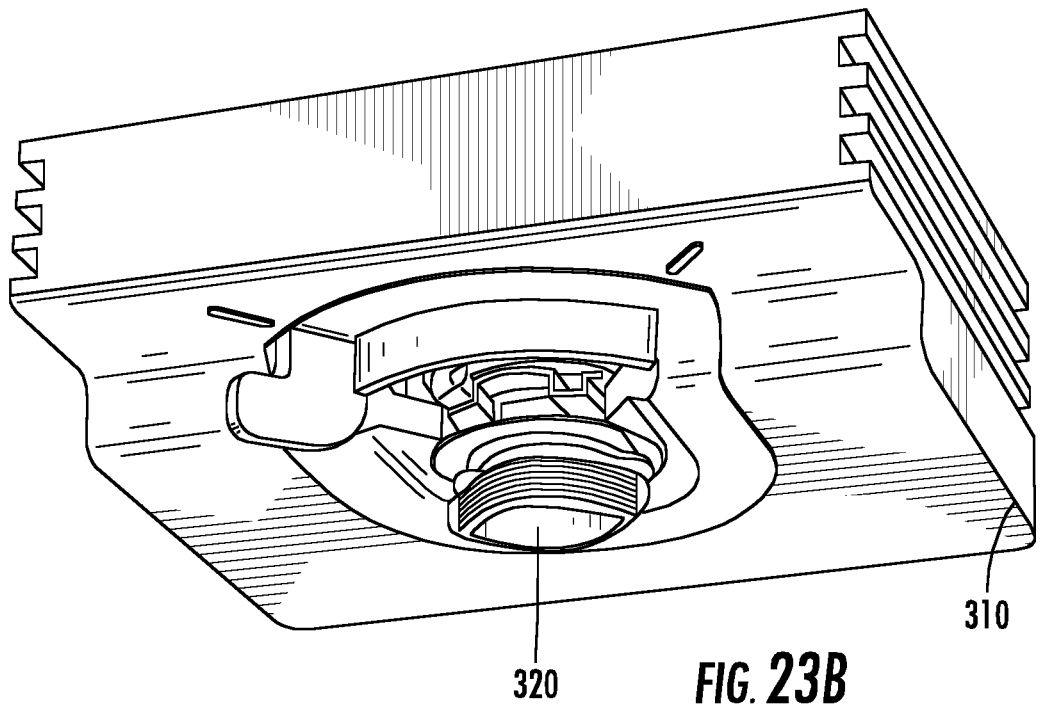
FIG. 23B is a perspective view of a coupled interconnector system with the receiver interconnector above the valve interconnector.

FIGS. 23A and 23B illustrate perspective views of coupled interconnector systems as illustrated in FIGS. 19-22. In FIG. 23A, valve interconnector 320 is above receiver interconnector 310. In FIG. 23B, receiver interconnector 310 is above valve interconnector 320. Either orientation/mounting can be used.

Figure 24A:
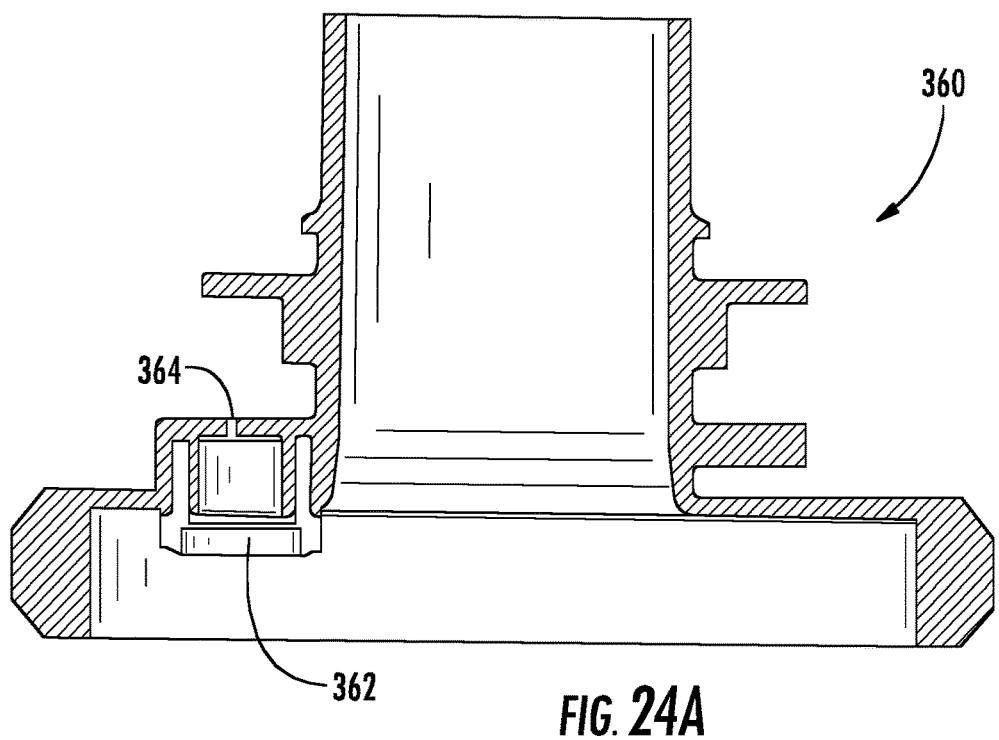
FIG. 24A is a longitudinal cross-sectional view of a neck portion of a valve interconnector, showing a vent in place.
Figure 24B:
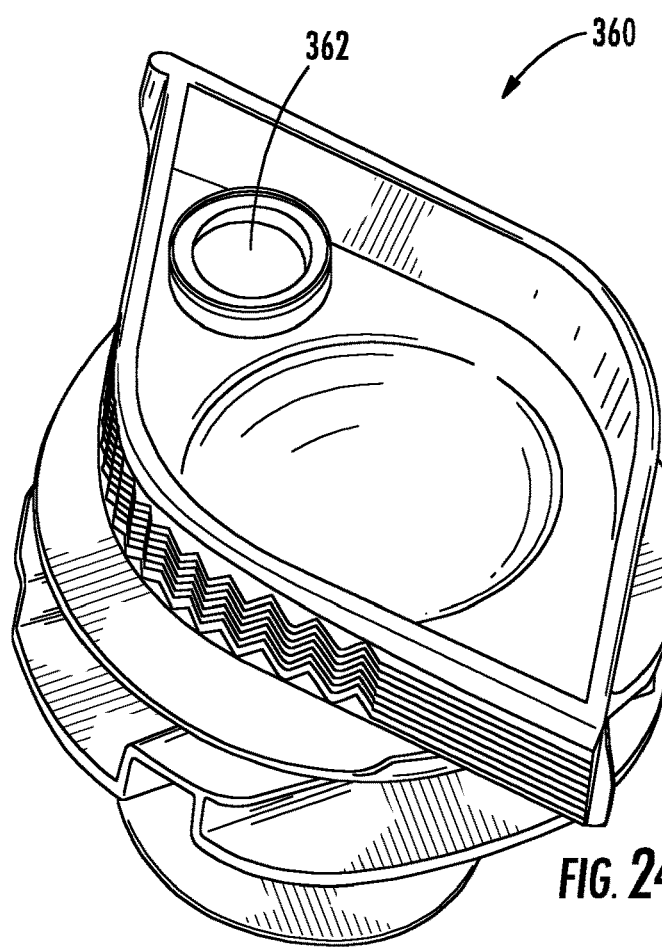
FIG. 24B is a perspective view of the neck portion of the valve interconnector of FIG. 24A, taken from below the outer end of the neck.
Figure 25D:
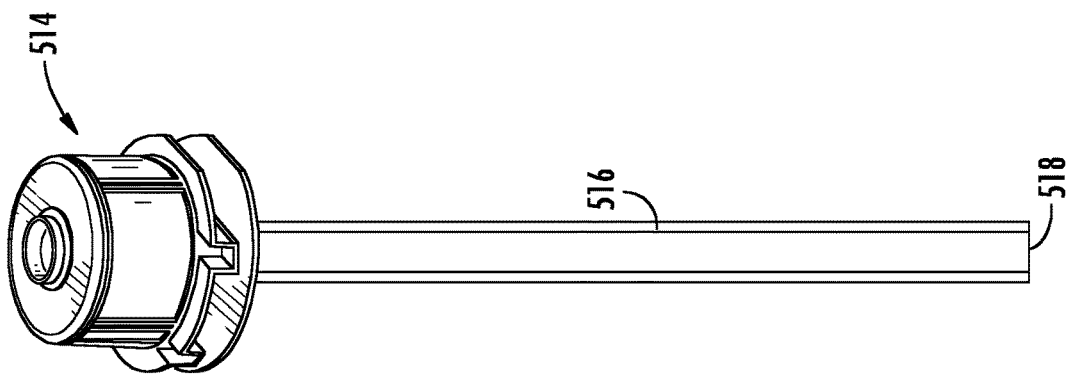
FIG. 25D is a perspective view of a valve interconnector with long tubing and no flow restrictor.
Figure 25C:
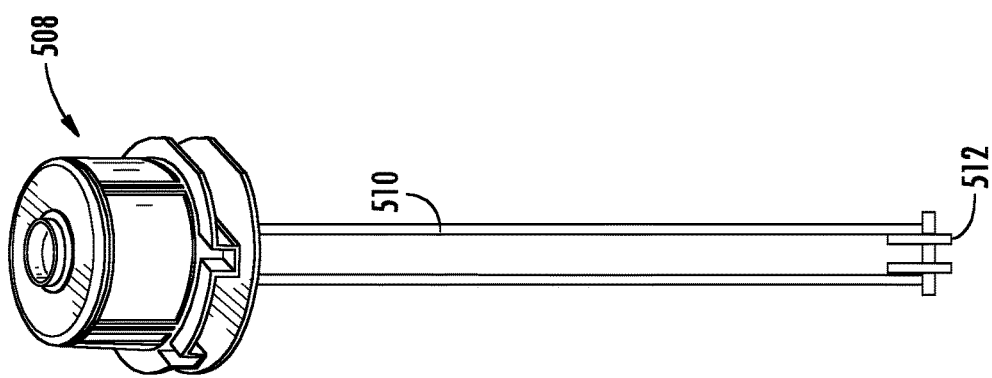
FIG. 25C is a perspective view of a valve interconnector with long tubing and flow restrictor.
Figure 25B:
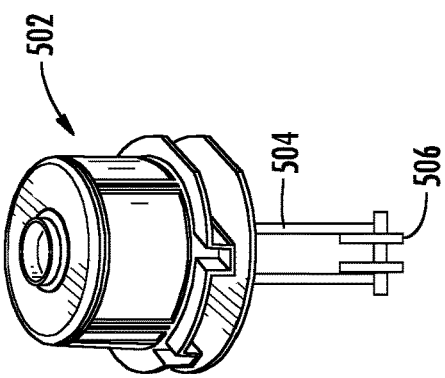
FIG. 25B is a perspective view of a valve interconnector with tubing and flow restrictor.
Figure 25A:
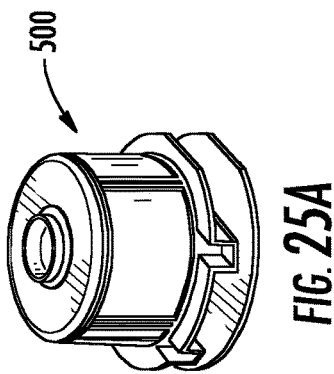
FIG. 25A is a perspective view of a valve interconnector.

FIGS. 24A and 24B illustrate a neck 360 for use in a valve interconnector. Neck 360 is provided with vent 362 which is made from a gas permeable material (for example Gore-Tex® brand gas permeable fabric) but is not readily permeable to liquid, such as aqueous solutions and dispersions. As illustrated in FIG. 24A, the gas permeable vent is beneath a chamber having a small venting hole 364 therein, so as to protect the gas permeable material and minimize evaporation.

Venting is used primarily when the hollow body contains a composition which forms a gas upon degradation, such as bleach, peracetic acid, etc., to prevent the hollow body from becoming pressurized. However, venting allows an empty hollow body to be filled with liquid without pressurizing the hollow body, and/or allows a full hollow body to be emptied without producing significant vacuum inside the hollow body during exodus of liquid from the hollow body.

FIGS. 25A, 25B, 25C, and 25D illustrate various valve interconnectors (without the bonding flange at the bottom of the neck). Valve interconnector 500 of FIG. 25 A has no tubing attached. Valve interconnector 502 of FIG. 25B has a short length of tubing 504 tipped with flow restrictor 506. Valve interconnector 508 of FIG. 25C has a longer length of tubing 510 tipped with flow restrictor 512. Valve interconnector 514 of FIG. 25D has a long length of tubing 516 having open end 518.

The receiver interconnector and/or the valve interconnector can optionally further comprises a flow sensor or liquid sensor. For example, the flow sensor can be used to detect flow through the hollow post or through a fluid conduit in a hollow body or a fluid conduit in the receiver interconnector. The presence of a flow sensor provides the user with information related to the amount of liquid dispensed as a function of time or during a specific period of time. For example, it can be used to determine how much liquid is used in a washing cycle.

Detecting the presence of liquid in a hollow body can be carried out by providing the hollow body with a reed-element or spaced apart electrodes so that the liquid when present provides a conductive path between the electrodes. Moreover, the hollow body can be provided with a valve which is biased closed but arranged open to admit air to the hollow body in the event that a pre-determined sub-atmospheric pressure is created within the hollow body, for example if a pump drawing from the hollow body is continuing to run when the supplying container is empty.

The valve assembly used in the valve interconnector can optionally include a flow restrictor. The flow regulator regulates the rate of flow of fluid through the valve or out of the valve. For example, the valve retainer can be made from a liquid impermeable material (e.g., injection molded plastic part) but be provided with one or more holes or passageways which limit the rate of flow of liquid through the valve and/or out of the valve retainer. A flow restrictor is beneficial in the event that a high dilution factor is desired.

The receiver interconnector and/or the valve interconnector can optionally further comprise a coupling indicator which signals whether the interconnectors are or are not coupled to one another. A coupling indicator provides verification to an operator that the coupling is complete, or that decoupling has occurred. The coupling indicator can provide a signal in the form of a light or a sound or can activate a computer to send a readable LED or LCD or other message disclosing the coupling status. A magnetically-actuated coupling signal receiver 436 can be provided, for example, in the receiver/hollow body combination illustrated in FIG. 27A. A magnetic triggering device, such as a magnet, can be provided on the end of seal sleeve locking arm 414 that moves into close proximity of signal receiver 436 upon coupling, as illustrated in FIG. 27C.

Although the present invention has been described with reference to various embodiments, it is to be understood that modifications and variations of the invention exist without departing from the principles and scope of the invention, as those skilled in the art will readily understand. Accordingly, such modifications are in accordance with the claims set forth below.

What is claimed is:

1. An interconnector system for coupling a first hollow body to a second hollow body to allow fluid communication between the first and second hollow bodies, comprising:
    (A) a valve interconnector comprising:
        (i) a neck having an internal surface and an external surface, the internal surface defining a longitudinal passageway through the neck, the neck having an internal end for coupling and an external end for securing the first hollow body to the valve interconnector;
        (ii) a valve assembly inside the longitudinal passageway through the neck, the valve assembly comprising a valve head, a valve stem, and a valve retainer, the valve head being biased away from the valve retainer and toward a valve seat inward of the valve head, the valve head being moveable from a closed position to an open position;
        (iii) a retention flange extending radially outward from the neck;
    (B) a hollow receiver interconnector comprising:
        (iv) a housing comprising a base member and an axial extension projecting from the base member, the housing having an internal surface for receiving the valve interconnector;
        (v) a hollow post having a closed internal valve-contact end, an open external end, and an internal longitudinal passageway therethrough, the longitudinal passageway extending from the open external end to the closed valve-contact end, with at least an internal portion of the hollow post being inside the housing, with the hollow post or the housing providing a surface for attachment to the second hollow body, the hollow post being in a fixed position relative to the housing, the hollow post having at least one radial passageway through a wall thereof, with the internal portion of the hollow post providing an external first sealing surface between the closed end of the hollow post and the radial passageway through the wall of the hollow post, and the hollow post providing an external second sealing surface outward of the radial passageway through the wall of the hollow post;
        (vi) a slidable retainer/seal sleeve inside the housing, the retainer/seal sleeve having a head portion extending around the hollow post, the head portion providing an inner sealing surface, the retainer/seal sleeve being slidable along the hollow post from an uncoupled position to a coupled position, the retainer/seal sleeve further comprising a valve retention surface;

wherein with the interconnectors in an uncoupled configuration: (a) the valve head is in the closed position with the valve head being held in biased contact with the valve seat, and (b) the retainer/seal sleeve is in the uncoupled position with the inner sealing surface of the retainer/seal sleeve covering the first and second sealing surfaces on the hollow post to seal closed the radial passageway thorough the wall in the hollow post; and
    wherein with the interconnectors in a coupled configuration: (a') the valve head is in the open position with the valve head being separated from the valve seat and held in the open position by the closed end of the hollow post and (b') the retainer/seal sleeve is in the coupled position leaving open the radial passageway through the wall of the hollow post, and the valve retention surface engaging the retention flange of the valve interconnector to retain the valve interconnector within the retainer/seal sleeve while the interconnectors are coupled to one another.

2. The interconnector system according to claim 1, wherein:
    the internal surface of the housing comprises a decoupling notch, and the slidable retainer/seal sleeve comprises a head portion and at least two axially extending flexible flap members, each flap member extending axially toward the receiving end of the housing, each flap member having an inner locking lug and outer locking lug, and
    with the interconnectors in an uncoupled configuration the outer locking lug of each of the flap members is positioned in the decoupling notch in the receiver housing; and
    with the interconnectors in a coupled configuration the inner locking lugs of the flap members contact the radial retention surface of the retention flange to retain the valve interconnector inside the receiver interconnector.

3. The interconnector system according to claim 2, further comprising a releasable seal sleeve retention member biased toward the head portion of the seal sleeve/retention member, the releasable seal sleeve/retention member engaging the seal sleeve when the seal sleeve is in the coupled position, so that axial movement of the seal sleeve/retention member is prevented by the releasable seal sleeve retention member while the valve interconnector is coupled to the receiver interconnector, the seal sleeve retention member being manually releasable to allow the receiver interconnector to be decoupled from the receiver interconnector.

4. The interconnector system according to claim 2, wherein the receiver housing has a radial surface which contacts the seal sleeve/retention member when the seal sleeve/retention member is in the uncoupled position, to prevent the head portion of the seal sleeve/retention member from sliding off the closed end of the hollow post.

5. The interconnector system according to claim 1, wherein
    the retention flange on the valve interconnector is a first flange extending from the neck, with the neck further comprising a second flange extending therefrom, the second flange being spaced apart from the first flange;
    the housing base member and the axial extension projecting from the base member together provide a recess for receiving the valve interconnector, with the recess terminating in a transverse mounting plate, with the hollow post mounted in the transverse mounting plate, the hollow post extending into the recess;

the receiver interconnector further comprises rotatable elevator member rotatably secured around an outer surface of the axial extension of the base member, the rotatable elevator member comprising an arcuate axial wall having a top edge contacting a surface of the housing from which the outer surface of the axial extension extends, the rotatable elevator member further comprising a radial projection extending outward from the arcuate axial wall, the radial projection having a manually-actuatable rotation tab extending therefrom, with the arcuate axial wall having a helical guideway therein;

the slidable retainer/seal sleeve comprises an assembly of a seal sleeve component and a retainer component, with the seal sleeve component and the retainer component being secured to one another so that they remain in a fixed relationship relative to one another with the interconnector system in the coupled configuration and with the interconnector system in the uncoupled configuration, with the retainer component being radially open for receiving the valve interconnector, the retainer component having a plurality of axial guides each of which slides in an axial direction within a corresponding axial recess in the axial extension of the base member, with at least one of the guides having a radial elevator protrusion extending outward therefrom, which pin is positioned to slide within the helical guideway in the elevator member as the elevator member is rotated, with the retainer comprising a retention and movement key having upper and lower radial surfaces which fit between the first and second flanges of the valve interconnector.

6. The interconnector system according to claim 5, wherein the housing further comprises a housing adapter fixedly secured to the housing, with the housing having an internal surface for receiving the slidable retainer/seal sleeve, and the housing adapter having an internal surface for receiving the valve interconnector.

7. The interconnector system according to claim 1, wherein the valve interconnector further comprises a base cap secured to the neck, the base cap comprising:
(a) a radially extending base cap head portion covering the internal end of the neck,
(b) an axially extending base cap exterior tube portion covering a portion of the exterior surface of the neck, and
(c) an axially extending base cap interior tube portion extending into the primary longitudinal passageway through the neck, the interior tube portion having an end providing the valve seat; and
wherein the valve assembly further comprises a valve stem extending from the valve head with the valve stem slidably positioned within a valve stem passageway through a liquid permeable valve retainer, the valve retainer being secured to the interior tube portion of the base cap.

8. The interconnector system according to claim 7, wherein the housing of the receiver interconnector is colored, and the valve interconnector further comprises a coded ring covering at least a portion of an external surface of the base cap and secured to the base cap, the coded ring having a color matching the color of the housing.

9. The interconnector system according to claim 8, wherein:
the coded ring further comprises a plurality of radial keys protruding therefrom, and the housing has an internal surface comprising a corresponding plurality of radially-extending keyways, with each of the plurality of radially-extending keys extending from the coded ring being sized and positioned for mating engagement with the corresponding plurality of radial keyways in the housing upon coupling the valve interconnector with the receiver interconnector; and
the coded ring has an outward edge comprising a plurality of axially-extending alignment lugs, and the coupling retention flange has a corresponding plurality of axially extending alignment channels, with the plurality of axially-extending lugs on the colored ring being sized and positioned for insertion into the corresponding plurality of axially-extending channels in the retention flange.

10. The interconnector system according to claim 8, wherein:
the coded ring further comprises a ring head portion, with the ring head portion comprising an axial key, with the axial key being inward of the head of the base cap, with the inward surface of the seal sleeve portion of the seal sleeve/retainer having an axial keyway within which the axial key is positioned with the interconnectors being in the coupled configuration.

11. The interconnector system according to claim 1, wherein the valve head is biased toward the valve seat by a spring inside the valve retainer, the spring being around the valve stem, the spring allowing the valve head and valve stem to slide within the valve retainer while the valve head is biased toward the valve seat.

12. The interconnector system according to claim 1, wherein the valve interconnector further comprises a resilient sealing ring inside the interior tube portion of the base cap which limits or prevents expansion of the sealing ring in the radial direction away from the hollow post to provide a leak-proof connection between the valve interconnector and the hollow post when the valve interconnector is coupled to the receiver interconnector and the resilient sealing ring is axially compressed.

13. The interconnector system according to claim 1, further comprising a flow restrictor.

14. The interconnector system according to claim 1, wherein the valve interconnector or the receiver interconnector further comprises a sensor activated by coupling the valve interconnector with the receiver interconnector.

15. The interconnector system according to claim 1, wherein the valve interconnector or the receiver interconnector further comprises an optical cell to indicate when a container is empty.

16. The interconnector system according to claim 1, comprising at least two radial passageways through the post wall of the hollow post.

17. The interconnector system according to claim 1, further comprising a bonding member on the external end of the neck of the valve interconnector, the bonding member having an outer bonding surface for attaching the first hollow body to the valve interconnector.

18. The interconnector system according to claim 1, wherein one of the interconnectors is connected to a hollow container containing a liquid chemical concentrate and the other interconnector is connected to a tube.

19. The interconnector system according to claim 1, wherein the receiver interconnector is mounted in a fixed position on a support member.

* * * * *